(12) United States Patent  
Fiatal

(10) Patent No.: US 8,909,192 B2  
(45) Date of Patent: Dec. 9, 2014

(54) MOBILE VIRTUAL NETWORK OPERATOR

(75) Inventor: Trevor Fiatal, Fremont, CA (US)

(73) Assignee: Seven Networks, Inc., San Carlos, CA (US)

( * ) Notice: Subject to any disclaimer, the term of this patent is extended or adjusted under 35 U.S.C. 154(b) by 624 days.

(21) Appl. No.: 13/208,185

(22) Filed: Aug. 11, 2011

(65) Prior Publication Data

US 2011/0294463 A1    Dec. 1, 2011

Related U.S. Application Data

(62) Division of application No. 12/008,710, filed on Jan. 11, 2008, now Pat. No. 8,107,921.

(51) Int. Cl.
*H04M 11/00*    (2006.01)
*H04M 3/487*    (2006.01)

(52) U.S. Cl.
CPC .................................. *H04M 3/4872* (2013.01)
USPC ........................... 455/406; 455/408; 455/405

(58) Field of Classification Search
USPC .......................................... 455/406, 405, 408
See application file for complete search history.

(56) References Cited

U.S. PATENT DOCUMENTS

| | | | |
|---|---|---|---|
| 222,458 | A | 12/1879 | Connolly et al. |
| 447,918 | A | 3/1891 | Strowger |
| 4,200,770 | A | 4/1980 | Hellman et al. |
| 4,255,796 | A | 3/1981 | Gabbe et al. |
| 4,276,597 | A | 6/1981 | Dissly et al. |
| 4,531,020 | A | 7/1985 | Wechselberger et al. |
| 4,807,182 | A | 2/1989 | Queen |
| 4,831,582 | A | 5/1989 | Miller et al. |
| 4,875,159 | A | 10/1989 | Cary et al. |
| 4,897,781 | A | 1/1990 | Chang et al. |
| 4,972,457 | A | 11/1990 | O'Sullivan |
| 5,008,853 | A | 4/1991 | Bly et al. |
| 5,159,624 | A | 10/1992 | Makita |
| 5,220,657 | A | 6/1993 | Bly et al. |
| 5,263,157 | A | 11/1993 | Janis |
| 5,283,856 | A | 2/1994 | Gross et al. |
| 5,357,431 | A | 10/1994 | Nakada et al. |
| 5,384,892 | A | 1/1995 | Strong |
| 5,386,564 | A | 1/1995 | Shearer et al. |

(Continued)

FOREIGN PATENT DOCUMENTS

| | | |
|---|---|---|
| EP | 0772327 A2 | 5/1997 |
| EP | 1278390 A1 | 1/2003 |

(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

*Primary Examiner* — Justin Lee
(74) *Attorney, Agent, or Firm* — NKK Patent Law, PLLC

(57) ABSTRACT

Systems and methods for operating a mobile virtual network are disclosed. A mobile virtual network operator is disclosed as an entity that provides a mobile networking service to a user, the mobile networking service being provided using a physical mobile network provided by a third party. The mobile virtual network operator may provide content distribution services, data access services, or messaging services to a user of a mobile device.

16 Claims, 4 Drawing Sheets

(56) References Cited

U.S. PATENT DOCUMENTS

| | | |
|---|---|---|
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,493,692 A | 2/1996 | Theimer et al. |
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostreski et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,087 A | 11/1998 | Herz et al. |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A | 4/2000 | Ginzboorg et al. |
| 6,047,327 A | 4/2000 | Tso et al. |

(56) References Cited

U.S. PATENT DOCUMENTS

| | | | |
|---|---|---|---|
| 6,052,563 A | 4/2000 | Macko |
| 6,052,735 A | 4/2000 | Ulrich et al. |
| 6,057,855 A | 5/2000 | Barkans |
| 6,065,055 A | 5/2000 | Hughes et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,101,320 A | 8/2000 | Schuetze et al. |
| 6,101,480 A | 8/2000 | Conmy et al. |
| 6,101,531 A | 8/2000 | Eggleston et al. |
| 6,112,181 A | 8/2000 | Shear et al. |
| 6,119,014 A | 9/2000 | Alperovich et al. |
| 6,119,171 A | 9/2000 | Alkhatib |
| 6,125,369 A | 9/2000 | Wu et al. |
| 6,125,388 A | 9/2000 | Reisman |
| 6,128,627 A | 10/2000 | Mattis et al. |
| 6,130,898 A | 10/2000 | Kostreski et al. |
| 6,131,096 A | 10/2000 | Ng et al. |
| 6,131,116 A | 10/2000 | Riggins et al. |
| 6,134,432 A | 10/2000 | Holmes et al. |
| 6,138,013 A | 10/2000 | Blanchard et al. |
| 6,138,124 A | 10/2000 | Beckhardt |
| 6,138,128 A | 10/2000 | Perkowitz et al. |
| 6,138,146 A | 10/2000 | Moon et al. |
| 6,141,664 A | 10/2000 | Boothby |
| 6,151,606 A | 11/2000 | Mendez |
| 6,157,630 A | 12/2000 | Adler et al. |
| 6,161,140 A | 12/2000 | Moriya |
| 6,167,379 A | 12/2000 | Dean et al. |
| 6,167,435 A | 12/2000 | Druckenmiller et al. |
| 6,170,014 B1 | 1/2001 | Darago et al. |
| 6,173,312 B1 | 1/2001 | Atarashi et al. |
| 6,173,446 B1 | 1/2001 | Khan et al. |
| 6,175,831 B1 | 1/2001 | Weinreich et al. |
| 6,178,419 B1 | 1/2001 | Legh-Smith et al. |
| 6,181,935 B1 | 1/2001 | Gossman et al. |
| 6,195,533 B1 | 2/2001 | Tkatch et al. |
| 6,198,696 B1 | 3/2001 | Korpi et al. |
| 6,198,922 B1 | 3/2001 | Baynham |
| 6,201,469 B1 | 3/2001 | Balch et al. |
| 6,202,085 B1 | 3/2001 | Benson et al. |
| 6,205,448 B1 | 3/2001 | Kruglikov et al. |
| 6,212,529 B1 | 4/2001 | Boothby et al. |
| 6,219,694 B1 | 4/2001 | Lazaridis et al. |
| 6,221,877 B1 | 4/2001 | Aronov et al. |
| 6,223,187 B1 | 4/2001 | Boothby et al. |
| 6,226,686 B1 | 5/2001 | Rothschild et al. |
| 6,233,341 B1 | 5/2001 | Riggins |
| 6,243,705 B1 | 6/2001 | Kucala |
| 6,246,875 B1 | 6/2001 | Seazholtz et al. |
| 6,247,135 B1 | 6/2001 | Feague |
| 6,249,808 B1 | 6/2001 | Seshadri |
| 6,256,666 B1 | 7/2001 | Singhal |
| 6,263,201 B1 | 7/2001 | Hashimoto et al. |
| 6,263,340 B1 | 7/2001 | Green |
| 6,269,369 B1 | 7/2001 | Robertson |
| 6,272,545 B1 | 8/2001 | Flanagin et al. |
| 6,275,850 B1 | 8/2001 | Beyda et al. |
| 6,275,858 B1 | 8/2001 | Bates et al. |
| 6,289,212 B1 | 9/2001 | Stein et al. |
| 6,289,214 B1 | 9/2001 | Backstrom |
| 6,292,904 B1 | 9/2001 | Broomhall et al. |
| 6,295,541 B1 | 9/2001 | Bodnar et al. |
| 6,300,947 B1 | 10/2001 | Kanevsky |
| 6,304,881 B1 | 10/2001 | Halim et al. |
| 6,308,201 B1 | 10/2001 | Pivowar et al. |
| 6,317,594 B1 | 11/2001 | Gossman et al. |
| 6,320,943 B1 | 11/2001 | Borland |
| 6,324,541 B1 | 11/2001 | de l'Etraz et al. |
| 6,324,542 B1 | 11/2001 | Wright, Jr. et al. |
| 6,324,544 B1 | 11/2001 | Alam et al. |
| 6,324,587 B1 | 11/2001 | Trenbeath et al. |
| 6,327,586 B1 | 12/2001 | Kisiel |
| 6,336,117 B1 | 1/2002 | Massarani |
| 6,356,937 B1 | 3/2002 | Montville et al. |
| 6,363,352 B1 | 3/2002 | Dailey et al. |
| 6,370,566 B2 | 4/2002 | Discolo et al. |
| 6,377,810 B1 | 4/2002 | Geiger et al. |
| 6,380,959 B1 | 4/2002 | Wang et al. |
| 6,389,422 B1 | 5/2002 | Doi et al. |
| 6,389,455 B1 | 5/2002 | Fuisz |
| 6,389,457 B2 | 5/2002 | Lazaridis et al. |
| 6,397,057 B1 | 5/2002 | Malackowski et al. |
| 6,397,230 B1 | 5/2002 | Carmel et al. |
| 6,401,104 B1 | 6/2002 | LaRue et al. |
| 6,401,112 B1 | 6/2002 | Boyer et al. |
| 6,401,113 B2 | 6/2002 | Lazaridis et al. |
| 6,405,197 B2 | 6/2002 | Gilmour |
| 6,411,696 B1 | 6/2002 | Iverson et al. |
| 6,415,031 B1 | 7/2002 | Colligan et al. |
| 6,418,308 B1 | 7/2002 | Heinonen et al. |
| 6,421,669 B1 | 7/2002 | Gilmour et al. |
| 6,421,781 B1 | 7/2002 | Fox et al. |
| 6,430,602 B1 | 8/2002 | Kay et al. |
| 6,438,585 B2 | 8/2002 | Mousseau et al. |
| 6,438,612 B1 | 8/2002 | Ylonen et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,487,557 B1 | 11/2002 | Nagatomo |
| 6,487,560 B1 | 11/2002 | LaRue et al. |
| 6,490,353 B1 | 12/2002 | Tan |
| 6,496,802 B1 | 12/2002 | van Zoest et al. |
| 6,499,054 B1 | 12/2002 | Hesselink et al. |
| 6,505,214 B1 | 1/2003 | Sherman et al. |
| 6,516,327 B1 | 2/2003 | Zondervan et al. |
| 6,526,433 B1 | 2/2003 | Chang et al. |
| 6,526,506 B1 | 2/2003 | Lewis |
| 6,529,908 B1 | 3/2003 | Piett et al. |
| 6,532,446 B1 | 3/2003 | King |
| 6,535,892 B1 | 3/2003 | LaRue et al. |
| 6,546,005 B1 | 4/2003 | Berkley et al. |
| 6,549,939 B1 | 4/2003 | Ford et al. |
| 6,556,217 B1 | 4/2003 | Mäkipää et al. |
| 6,593,944 B1 | 7/2003 | Nicolas et al. |
| 6,601,026 B2 | 7/2003 | Appelt et al. |
| 6,615,253 B1 | 9/2003 | Bowman-Amuah |
| 6,618,710 B1 | 9/2003 | Zondervan et al. |
| 6,621,892 B1 | 9/2003 | Banister et al. |
| 6,625,621 B2 | 9/2003 | Tan et al. |
| 6,636,482 B2 | 10/2003 | Cloonan et al. |
| 6,639,693 B1 | 10/2003 | Ejiri et al. |
| 6,640,097 B2 | 10/2003 | Corrigan et al. |
| 6,640,244 B1 | 10/2003 | Bowman-Amuah |
| 6,640,249 B1 | 10/2003 | Bowman-Amuah |
| 6,643,650 B1 | 11/2003 | Slaughter et al. |
| 6,643,688 B1 | 11/2003 | Fuisz |
| 6,647,384 B2 | 11/2003 | Gilmour |
| 6,650,890 B1 | 11/2003 | Irlam et al. |
| 6,662,016 B1 | 12/2003 | Buckham et al. |
| 6,668,046 B1 | 12/2003 | Albal |
| 6,671,695 B1 | 12/2003 | McFadden |
| 6,671,700 B1 | 12/2003 | Creemer et al. |
| 6,671,702 B2 | 12/2003 | Kruglikov et al. |
| 6,671,757 B1 | 12/2003 | Multer et al. |
| 6,694,336 B1 | 2/2004 | Multer et al. |
| 6,697,807 B2 | 2/2004 | McGeachie |
| 6,701,378 B1 | 3/2004 | Gilhuly et al. |
| 6,707,801 B2 | 3/2004 | Hsu |
| 6,708,221 B1 | 3/2004 | Mendez et al. |
| 6,714,965 B2 | 3/2004 | Kakuta et al. |
| 6,721,787 B1 | 4/2004 | Hiscock |
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |

(56) References Cited

U.S. PATENT DOCUMENTS

| | | |
|---|---|---|
| 6,741,855 B1 | 5/2004 | Martin et al. |
| 6,742,015 B1 | 5/2004 | Bowman-Amuah |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,871,236 B2 | 3/2005 | Fishman et al. |
| 6,873,688 B1 | 3/2005 | Aarnio |
| 6,874,017 B1 | 3/2005 | Inoue et al. |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,933 B1 | 1/2006 | Singhai et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,999,753 B2 | 2/2006 | Beckmann et al. |
| 7,020,685 B1 | 3/2006 | Chen et al. |
| 7,024,491 B1 | 4/2006 | Hanmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,185,362 B2 | 2/2007 | Hawkes et al. |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,272,830 B2 | 9/2007 | de Jong |
| 7,277,408 B2 | 10/2007 | Sorsa |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,305,252 B2 | 12/2007 | Britt et al. |
| 7,305,700 B2 | 12/2007 | Boynton et al. |
| 7,310,350 B1 | 12/2007 | Shao et al. |
| 7,310,729 B2 | 12/2007 | Gordon et al. |
| 7,349,871 B2 | 3/2008 | Labrou et al. |
| 7,359,720 B2 | 4/2008 | Hartmaier et al. |
| 7,373,386 B2 | 5/2008 | Gardner et al. |
| 7,374,099 B2 | 5/2008 | de Jong |
| 7,376,701 B2 | 5/2008 | Bhargava et al. |
| 7,382,879 B1 | 6/2008 | Miller |
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,398,271 B1 | 7/2008 | Borkovsky et al. |
| 7,430,609 B2 | 9/2008 | Brown et al. |
| 7,441,271 B2 | 10/2008 | Fiatal et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,483,036 B2 | 1/2009 | Moore |
| 7,499,537 B2 | 3/2009 | Elsey et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,548,947 B2 | 6/2009 | Kasriel et al. |
| 7,551,900 B2 | 6/2009 | Kang et al. |
| 7,567,575 B2 | 7/2009 | Chen et al. |
| 7,574,208 B2 | 8/2009 | Hanson et al. |
| 7,575,171 B2 | 8/2009 | Lev |
| 7,584,294 B2 | 9/2009 | Plamondon |
| 7,587,482 B2 | 9/2009 | Henderson et al. |

(56) References Cited

U.S. PATENT DOCUMENTS

| | | |
|---|---|---|
| 7,587,608 B2 | 9/2009 | Haller et al. |
| 7,593,714 B2 | 9/2009 | Schultz et al. |
| 7,596,608 B2 | 9/2009 | Alexander et al. |
| 7,613,792 B2 | 11/2009 | Zervas et al. |
| 7,643,818 B2 | 1/2010 | Backholm et al. |
| 7,644,166 B2 | 1/2010 | Appelman et al. |
| 7,672,439 B2 | 3/2010 | Appelman et al. |
| 7,680,281 B2 | 3/2010 | Fiatal et al. |
| 7,689,664 B2 | 3/2010 | Karlberg |
| 7,693,944 B2 | 4/2010 | Appelman et al. |
| 7,694,008 B2 | 4/2010 | Chang et al. |
| 7,706,781 B2 | 4/2010 | Backholm et al. |
| 7,752,633 B1 | 7/2010 | Fleming |
| 7,757,956 B2 | 7/2010 | Koenck et al. |
| 7,769,395 B2 | 8/2010 | Fiatal et al. |
| 7,769,400 B2 | 8/2010 | Backholm et al. |
| 7,769,805 B1 | 8/2010 | Barnes et al. |
| 7,778,792 B2 | 8/2010 | Huang et al. |
| 7,783,757 B2 | 8/2010 | Plamondon |
| 7,796,742 B1 | 9/2010 | Sutaria et al. |
| 7,797,064 B2 | 9/2010 | Loomis et al. |
| 7,809,818 B2 | 10/2010 | Plamondon |
| 7,827,055 B1 | 11/2010 | Snodgrass et al. |
| 7,827,597 B2 | 11/2010 | Boynton et al. |
| 7,853,563 B2 | 12/2010 | Alvarado et al. |
| 7,877,703 B1 | 1/2011 | Fleming |
| 7,899,996 B1 | 3/2011 | Levin-Michael |
| 7,917,505 B2 | 3/2011 | van Gent et al. |
| 7,921,167 B2 | 4/2011 | Shroff et al. |
| 7,933,929 B1 | 4/2011 | McClendon et al. |
| 7,937,091 B2 | 5/2011 | Roman et al. |
| 7,970,860 B2 | 6/2011 | Kline et al. |
| 7,996,487 B2 | 8/2011 | Snyder |
| 8,000,720 B2 | 8/2011 | Aaron |
| 8,005,891 B2 | 8/2011 | Knowles et al. |
| 8,010,082 B2 | 8/2011 | Sutaria et al. |
| 8,032,409 B1 | 10/2011 | Mikurak |
| 8,064,583 B1 | 11/2011 | Sutaria et al. |
| 8,069,166 B2 | 11/2011 | Alvarado et al. |
| 8,078,158 B2 | 12/2011 | Backholm |
| 2001/0009025 A1 | 7/2001 | Ahonen |
| 2001/0010046 A1 | 7/2001 | Muyres et al. |
| 2001/0013069 A1 | 8/2001 | Shah |
| 2001/0023414 A1 | 9/2001 | Kumar et al. |
| 2001/0032254 A1 | 10/2001 | Hawkins |
| 2001/0034225 A1 | 10/2001 | Gupte et al. |
| 2001/0034244 A1 | 10/2001 | Calder et al. |
| 2001/0037453 A1 | 11/2001 | Mitty et al. |
| 2001/0039191 A1 | 11/2001 | Maierhofer |
| 2001/0041566 A1 | 11/2001 | Xanthos et al. |
| 2001/0042009 A1 | 11/2001 | Montague |
| 2001/0042099 A1 | 11/2001 | Peng |
| 2001/0043148 A1 | 11/2001 | Stewart |
| 2001/0053687 A1 | 12/2001 | Sivula |
| 2002/0002478 A1 | 1/2002 | Swart et al. |
| 2002/0002591 A1 | 1/2002 | Ketola |
| 2002/0007303 A1 | 1/2002 | Brookler et al. |
| 2002/0013727 A1 | 1/2002 | Lee |
| 2002/0019225 A1 | 2/2002 | Miyashita |
| 2002/0019812 A1 | 2/2002 | Board et al. |
| 2002/0035556 A1 | 3/2002 | Shah et al. |
| 2002/0035617 A1 | 3/2002 | Lynch et al. |
| 2002/0038253 A1 | 3/2002 | Seaman et al. |
| 2002/0042875 A1 | 4/2002 | Shukla |
| 2002/0049828 A1 | 4/2002 | Pekarek-Kostka |
| 2002/0053078 A1 | 5/2002 | Holtz et al. |
| 2002/0055351 A1 | 5/2002 | Elsey et al. |
| 2002/0059201 A1 | 5/2002 | Work |
| 2002/0059457 A1 | 5/2002 | Ballard et al. |
| 2002/0068559 A1 | 6/2002 | Sharma et al. |
| 2002/0073207 A1 | 6/2002 | Widger et al. |
| 2002/0077077 A1 | 6/2002 | Rezvani et al. |
| 2002/0077084 A1 | 6/2002 | Zellner et al. |
| 2002/0078384 A1 | 6/2002 | Hippelainen |
| 2002/0087549 A1 | 7/2002 | Mostafa |
| 2002/0087679 A1 | 7/2002 | Pulley et al. |
| 2002/0089542 A1 | 7/2002 | Imamura |
| 2002/0091921 A1 | 7/2002 | Kunzinger |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0095399 A1 | 7/2002 | Devine et al. |
| 2002/0098855 A1 | 7/2002 | Hartmaier et al. |
| 2002/0099613 A1 | 7/2002 | Swart et al. |
| 2002/0099809 A1 | 7/2002 | Lee |
| 2002/0101975 A1 | 8/2002 | Tiburtius et al. |
| 2002/0107944 A1 | 8/2002 | Bai et al. |
| 2002/0107985 A1 | 8/2002 | Hwang et al. |
| 2002/0116499 A1 | 8/2002 | Ennus et al. |
| 2002/0116501 A1 | 8/2002 | Ho et al. |
| 2002/0120766 A1 | 8/2002 | Okajima et al. |
| 2002/0120779 A1 | 8/2002 | Teeple et al. |
| 2002/0126701 A1 | 9/2002 | Requena |
| 2002/0133504 A1 | 9/2002 | Vlahos et al. |
| 2002/0144109 A1 | 10/2002 | Benantar et al. |
| 2002/0146129 A1 | 10/2002 | Kaplan |
| 2002/0152379 A1 | 10/2002 | Gefwert et al. |
| 2002/0155848 A1 | 10/2002 | Suryanarayana |
| 2002/0156839 A1 | 10/2002 | Peterson et al. |
| 2002/0158908 A1 | 10/2002 | Vaajala et al. |
| 2002/0161587 A1 | 10/2002 | Pitts, III et al. |
| 2002/0161925 A1 | 10/2002 | Munger et al. |
| 2002/0161928 A1 | 10/2002 | Ndili |
| 2002/0164977 A1 | 11/2002 | Link, II et al. |
| 2002/0167484 A1 | 11/2002 | Hatanaka et al. |
| 2002/0174189 A1 | 11/2002 | Peng |
| 2002/0186848 A1 | 12/2002 | Shaik |
| 2002/0188940 A1 | 12/2002 | Breckner et al. |
| 2002/0193094 A1 | 12/2002 | Lawless et al. |
| 2002/0194209 A1 | 12/2002 | Bolosky et al. |
| 2002/0198027 A1 | 12/2002 | Rydbeck |
| 2003/0005151 A1 | 1/2003 | Ullman et al. |
| 2003/0022662 A1 | 1/2003 | Mittal |
| 2003/0023692 A1 | 1/2003 | Moroo |
| 2003/0023975 A1 | 1/2003 | Schrader et al. |
| 2003/0028430 A1 | 2/2003 | Zimmerman |
| 2003/0028441 A1 | 2/2003 | Barsness et al. |
| 2003/0050041 A1 | 3/2003 | Wu |
| 2003/0054810 A1 | 3/2003 | Chen et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065739 A1 | 4/2003 | Shnier |
| 2003/0065802 A1 | 4/2003 | Vitikainen et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0088629 A1 | 5/2003 | Berkowitz et al. |
| 2003/0093691 A1 | 5/2003 | Simon et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0117432 A1 | 6/2003 | Kautto-Kiovula et al. |
| 2003/0120685 A1 | 6/2003 | Duncombe et al. |
| 2003/0125023 A1 | 7/2003 | Fishler |
| 2003/0126216 A1 | 7/2003 | Avila et al. |
| 2003/0130984 A1 | 7/2003 | Quinlan et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1 | 8/2003 | Fiatal et al. |
| 2003/0169262 A1 | 9/2003 | Lavelle et al. |
| 2003/0177281 A1 | 9/2003 | McQuillan et al. |
| 2003/0182431 A1 | 9/2003 | Sturniolo et al. |
| 2003/0187984 A1 | 10/2003 | Banavar et al. |
| 2003/0204605 A1 | 10/2003 | Hudson et al. |
| 2003/0208529 A1 | 11/2003 | Pendyala et al. |
| 2003/0208559 A1 | 11/2003 | Velline et al. |
| 2003/0210666 A1 | 11/2003 | Trossen et al. |
| 2003/0211845 A1 | 11/2003 | Lohtia et al. |
| 2003/0217098 A1 | 11/2003 | Bobde et al. |

(56) References Cited

U.S. PATENT DOCUMENTS

| | | |
|---|---|---|
| 2003/0217142 A1 | 11/2003 | Bobde et al. |
| 2003/0223554 A1 | 12/2003 | Zhang |
| 2003/0227745 A1 | 12/2003 | Khoo |
| 2003/0235308 A1 | 12/2003 | Boynton et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0024795 A1 | 2/2004 | Hind et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0043770 A1 | 3/2004 | Amit et al. |
| 2004/0049579 A1 | 3/2004 | Ims et al. |
| 2004/0049599 A1 | 3/2004 | Friend et al. |
| 2004/0051715 A1 | 3/2004 | Brokenshire et al. |
| 2004/0054739 A1 | 3/2004 | Friend et al. |
| 2004/0064445 A1 | 4/2004 | Pfleging et al. |
| 2004/0064488 A1 | 4/2004 | Sinha |
| 2004/0068579 A1 | 4/2004 | Marmigere et al. |
| 2004/0068698 A1 | 4/2004 | Wu et al. |
| 2004/0073476 A1 | 4/2004 | Donahue et al. |
| 2004/0073651 A1 | 4/2004 | Beaulieu et al. |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0082346 A1 | 4/2004 | Skytt et al. |
| 2004/0098625 A1 | 5/2004 | Lagadec et al. |
| 2004/0103147 A1 | 5/2004 | Flesher et al. |
| 2004/0107319 A1 | 6/2004 | D'Orto et al. |
| 2004/0120323 A1 | 6/2004 | Viikari et al. |
| 2004/0123304 A1 | 6/2004 | Black et al. |
| 2004/0128375 A1 | 7/2004 | Rockwell |
| 2004/0133626 A1 | 7/2004 | Herrero et al. |
| 2004/0141011 A1 | 7/2004 | Smethers et al. |
| 2004/0147248 A1 | 7/2004 | Will |
| 2004/0147262 A1 | 7/2004 | Lescuyer et al. |
| 2004/0158611 A1 | 8/2004 | Daniell et al. |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0177369 A1 | 9/2004 | Akins, III |
| 2004/0179513 A1 | 9/2004 | Smith et al. |
| 2004/0181550 A1 | 9/2004 | Warsta et al. |
| 2004/0186902 A1 | 9/2004 | Stewart |
| 2004/0189610 A1 | 9/2004 | Friend |
| 2004/0199497 A1 | 10/2004 | Timmons |
| 2004/0199582 A1 | 10/2004 | Kucharewski et al. |
| 2004/0199663 A1 | 10/2004 | Horvitz et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0210639 A1 | 10/2004 | Ben-Yoseph et al. |
| 2004/0230619 A1 | 11/2004 | Blanco et al. |
| 2004/0233930 A1 | 11/2004 | Colby, Jr. |
| 2004/0236792 A1 | 11/2004 | Celik |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022182 A1 | 1/2005 | Mittal |
| 2005/0027591 A9 | 2/2005 | Gailey et al. |
| 2005/0027716 A1 | 2/2005 | Apfel |
| 2005/0033812 A1 | 2/2005 | McCarthy et al. |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0055578 A1 | 3/2005 | Wright et al. |
| 2005/0063544 A1 | 3/2005 | Uusitalo et al. |
| 2005/0071489 A1 | 3/2005 | Parupudi et al. |
| 2005/0071674 A1 | 3/2005 | Chou et al. |
| 2005/0073982 A1 | 4/2005 | Corneille et al. |
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0102351 A1 | 5/2005 | Jiang et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0122333 A1 | 6/2005 | Sumanaweera et al. |
| 2005/0124332 A1 | 6/2005 | Clark et al. |
| 2005/0138111 A1 | 6/2005 | Aton et al. |
| 2005/0144219 A1 | 6/2005 | Terada |
| 2005/0154698 A1 | 7/2005 | Ikezawa et al. |
| 2005/0154796 A1 | 7/2005 | Forsyth |
| 2005/0154836 A1 | 7/2005 | Steely et al. |
| 2005/0155027 A1 | 7/2005 | Wei |
| 2005/0164721 A1 | 7/2005 | Eric Yeh et al. |
| 2005/0165909 A1 | 7/2005 | Cromer et al. |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0193096 A1 | 9/2005 | Yu et al. |
| 2005/0203966 A1 | 9/2005 | Labrou et al. |
| 2005/0210104 A1 | 9/2005 | Torvinen |
| 2005/0210125 A1 | 9/2005 | Li |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little, II |
| 2005/0254443 A1 | 11/2005 | Campbell et al. |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0012672 A1 | 1/2006 | Schrader et al. |
| 2006/0020525 A1 | 1/2006 | Borelli et al. |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031365 A1 | 2/2006 | Kay et al. |
| 2006/0031428 A1 | 2/2006 | Wikman |
| 2006/0031785 A1 | 2/2006 | Raciborski |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0059495 A1 | 3/2006 | Spector |
| 2006/0063544 A1 | 3/2006 | Zhao et al. |

(56) References Cited

U.S. PATENT DOCUMENTS

| | | |
|---|---|---|
| 2006/0069686 A1 | 3/2006 | Beyda et al. |
| 2006/0069687 A1 | 3/2006 | Cui et al. |
| 2006/0069742 A1 | 3/2006 | Segre |
| 2006/0073810 A1 | 4/2006 | Pyhalammi et al. |
| 2006/0074951 A1 | 4/2006 | Beier et al. |
| 2006/0075028 A1 | 4/2006 | Zager et al. |
| 2006/0084410 A1 | 4/2006 | Sutaria et al. |
| 2006/0085503 A1 | 4/2006 | Stoye et al. |
| 2006/0093026 A1 | 5/2006 | Montojo et al. |
| 2006/0093135 A1 | 5/2006 | Fiatal et al. |
| 2006/0099969 A1 | 5/2006 | Staton et al. |
| 2006/0112177 A1 | 5/2006 | Barkley et al. |
| 2006/0123042 A1 | 6/2006 | Xie et al. |
| 2006/0132495 A1 | 6/2006 | Anderson |
| 2006/0141962 A1 | 6/2006 | Forbes et al. |
| 2006/0143464 A1 | 6/2006 | Ananthanarayanan et al. |
| 2006/0149591 A1 | 7/2006 | Hanf et al. |
| 2006/0149843 A1 | 7/2006 | Rhoads et al. |
| 2006/0149970 A1 | 7/2006 | Imazu |
| 2006/0161621 A1 | 7/2006 | Rosenberg |
| 2006/0165226 A1 | 7/2006 | Ernst et al. |
| 2006/0168043 A1 | 7/2006 | Eisenberger et al. |
| 2006/0168164 A1 | 7/2006 | Lemson et al. |
| 2006/0179410 A1 | 8/2006 | Deeds |
| 2006/0188864 A1 | 8/2006 | Shah |
| 2006/0190428 A1 | 8/2006 | Jung et al. |
| 2006/0190984 A1 | 8/2006 | Heard et al. |
| 2006/0192014 A1 | 8/2006 | Hamilton et al. |
| 2006/0195570 A1 | 8/2006 | Zellner et al. |
| 2006/0209842 A1 | 9/2006 | Creamer et al. |
| 2006/0212531 A1 | 9/2006 | Kikkawa et al. |
| 2006/0224629 A1 | 10/2006 | Alexander et al. |
| 2006/0230394 A1 | 10/2006 | Forth et al. |
| 2006/0240804 A1 | 10/2006 | Backholm et al. |
| 2006/0240805 A1 | 10/2006 | Backholm et al. |
| 2006/0242137 A1 | 10/2006 | Shah et al. |
| 2006/0242210 A1 | 10/2006 | Ring et al. |
| 2006/0242320 A1 | 10/2006 | Nettle et al. |
| 2006/0242607 A1 | 10/2006 | Hudson |
| 2006/0252435 A1 | 11/2006 | Henderson et al. |
| 2006/0253456 A1 | 11/2006 | Pacholec et al. |
| 2006/0253605 A1 | 11/2006 | Sundarrajan et al. |
| 2006/0259923 A1 | 11/2006 | Chiu |
| 2006/0265595 A1 | 11/2006 | Scottodiluzio |
| 2006/0271884 A1 | 11/2006 | Hurst |
| 2006/0277265 A1 | 12/2006 | Backholm et al. |
| 2006/0277271 A1 | 12/2006 | Morse et al. |
| 2006/0294071 A1 | 12/2006 | Weare et al. |
| 2006/0294223 A1 | 12/2006 | Glasgow et al. |
| 2007/0005738 A1 | 1/2007 | Alexion-Tiernan et al. |
| 2007/0011367 A1 | 1/2007 | Scott et al. |
| 2007/0019610 A1 | 1/2007 | Backholm et al. |
| 2007/0022118 A1 | 1/2007 | Layne |
| 2007/0027775 A1 | 2/2007 | Hwang |
| 2007/0027832 A1 | 2/2007 | Fiatal et al. |
| 2007/0027886 A1 | 2/2007 | Gent et al. |
| 2007/0027917 A1 | 2/2007 | Ariel et al. |
| 2007/0027920 A1 | 2/2007 | Alvarado et al. |
| 2007/0027921 A1 | 2/2007 | Alvarado et al. |
| 2007/0027930 A1 | 2/2007 | Alvarado et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0044041 A1 | 2/2007 | Beynon et al. |
| 2007/0049258 A1 | 3/2007 | Thibeault |
| 2007/0060196 A1 | 3/2007 | Sharma |
| 2007/0061393 A1 | 3/2007 | Moore |
| 2007/0067381 A1 | 3/2007 | Grant et al. |
| 2007/0067424 A1 | 3/2007 | Raciborski et al. |
| 2007/0078857 A1 | 4/2007 | Punaganti et al. |
| 2007/0078964 A1 | 4/2007 | East et al. |
| 2007/0088852 A1 | 4/2007 | Levkovitz |
| 2007/0105627 A1 | 5/2007 | Campbell |
| 2007/0116223 A1 | 5/2007 | Burke et al. |
| 2007/0117548 A1* | 5/2007 | Fernandez-Alonso et al. .............. 455/414.1 |
| 2007/0118620 A1 | 5/2007 | Cartmell et al. |
| 2007/0130108 A1 | 6/2007 | Simpson et al. |
| 2007/0130217 A1 | 6/2007 | Linyard et al. |
| 2007/0140193 A1 | 6/2007 | Dosa et al. |
| 2007/0149168 A1 | 6/2007 | Hariki |
| 2007/0150881 A1 | 6/2007 | Khawand et al. |
| 2007/0156824 A1 | 7/2007 | Thompson |
| 2007/0156842 A1 | 7/2007 | Vermeulen et al. |
| 2007/0162514 A1 | 7/2007 | Civetta et al. |
| 2007/0167178 A1 | 7/2007 | Al-Harbi |
| 2007/0174433 A1 | 7/2007 | Mendez et al. |
| 2007/0175998 A1 | 8/2007 | Lev |
| 2007/0198698 A1 | 8/2007 | Boyd et al. |
| 2007/0220080 A1 | 9/2007 | Humphrey |
| 2007/0233855 A1 | 10/2007 | Brown et al. |
| 2007/0245010 A1 | 10/2007 | Arn et al. |
| 2007/0249365 A1 | 10/2007 | Jendbro |
| 2007/0250591 A1 | 10/2007 | Milic-Frayling et al. |
| 2007/0264993 A1 | 11/2007 | Hughes |
| 2007/0267492 A1 | 11/2007 | Maclaine Pont |
| 2007/0276925 A1 | 11/2007 | LaJoie et al. |
| 2007/0276926 A1 | 11/2007 | LaJoie et al. |
| 2007/0288469 A1 | 12/2007 | Shenfield |
| 2007/0290787 A1 | 12/2007 | Fiatal et al. |
| 2007/0293207 A1 | 12/2007 | Guedalia et al. |
| 2007/0293238 A1 | 12/2007 | Fiatal et al. |
| 2007/0294295 A1 | 12/2007 | Finkelstein et al. |
| 2007/0294763 A1 | 12/2007 | Udezue et al. |
| 2008/0001717 A1 | 1/2008 | Fiatal |
| 2008/0008095 A1 | 1/2008 | Gilfix |
| 2008/0009344 A1 | 1/2008 | Graham et al. |
| 2008/0016236 A1 | 1/2008 | Beverly et al. |
| 2008/0022003 A1 | 1/2008 | Alve |
| 2008/0032718 A1 | 2/2008 | Suresh |
| 2008/0037787 A1 | 2/2008 | Boynton et al. |
| 2008/0059308 A1 | 3/2008 | Gerken |
| 2008/0059398 A1 | 3/2008 | Tsutsui |
| 2008/0061142 A1 | 3/2008 | Howcroft et al. |
| 2008/0068519 A1 | 3/2008 | Adler et al. |
| 2008/0077506 A1 | 3/2008 | Rampell et al. |
| 2008/0077571 A1 | 3/2008 | Harris et al. |
| 2008/0085724 A1 | 4/2008 | Cormier et al. |
| 2008/0086379 A1 | 4/2008 | Dion et al. |
| 2008/0103877 A1 | 5/2008 | Gerken |
| 2008/0114690 A1* | 5/2008 | Skidmore et al. ................ 705/52 |
| 2008/0114881 A1 | 5/2008 | Lee et al. |
| 2008/0125225 A1 | 5/2008 | Lazaridis et al. |
| 2008/0130663 A1 | 6/2008 | Fridman et al. |
| 2008/0133326 A1 | 6/2008 | Goncalves et al. |
| 2008/0133641 A1 | 6/2008 | Gent et al. |
| 2008/0133708 A1 | 6/2008 | Alvarado et al. |
| 2008/0134292 A1 | 6/2008 | Ariel et al. |
| 2008/0140665 A1 | 6/2008 | Ariel et al. |
| 2008/0151817 A1 | 6/2008 | Fitchett et al. |
| 2008/0154870 A1 | 6/2008 | Evermann et al. |
| 2008/0155613 A1 | 6/2008 | Benya et al. |
| 2008/0168145 A1 | 7/2008 | Wilson |
| 2008/0192820 A1 | 8/2008 | Brooks et al. |
| 2008/0198995 A1 | 8/2008 | McGary et al. |
| 2008/0201362 A1 | 8/2008 | Multer et al. |
| 2008/0201751 A1 | 8/2008 | Ahmed et al. |
| 2008/0207182 A1 | 8/2008 | Maharajh et al. |
| 2008/0209491 A1 | 8/2008 | Hasek |
| 2008/0214148 A1 | 9/2008 | Ramer et al. |
| 2008/0216094 A1 | 9/2008 | Anderson et al. |
| 2008/0220797 A1 | 9/2008 | Meiby et al. |
| 2008/0232290 A1 | 9/2008 | Elzur et al. |
| 2008/0233983 A1 | 9/2008 | Park et al. |
| 2008/0270379 A1 | 10/2008 | Ramakrishna |
| 2008/0273498 A1 | 11/2008 | Jalil et al. |
| 2008/0281798 A1 | 11/2008 | Chatterjee et al. |
| 2008/0288659 A1 | 11/2008 | Hasha et al. |
| 2008/0298386 A1 | 12/2008 | Fiatal |
| 2008/0299956 A1 | 12/2008 | Bailey et al. |
| 2008/0301231 A1 | 12/2008 | Mehta et al. |
| 2008/0301300 A1 | 12/2008 | Toub |
| 2008/0313282 A1 | 12/2008 | Warila et al. |

(56) References Cited

U.S. PATENT DOCUMENTS

| | | |
|---|---|---|
| 2009/0012841 A1 | 1/2009 | Saft et al. |
| 2009/0016526 A1 | 1/2009 | Fiatal et al. |
| 2009/0019485 A1 | 1/2009 | Ellis et al. |
| 2009/0019532 A1 | 1/2009 | Jacobsen et al. |
| 2009/0031006 A1 | 1/2009 | Johnson |
| 2009/0052372 A1 | 2/2009 | Durazzo et al. |
| 2009/0054034 A1 | 2/2009 | Backholm et al. |
| 2009/0055353 A1 | 2/2009 | Meema |
| 2009/0063647 A1 | 3/2009 | Backholm et al. |
| 2009/0075683 A1 | 3/2009 | Backholm et al. |
| 2009/0077263 A1 | 3/2009 | Koganti et al. |
| 2009/0094317 A1 | 4/2009 | Venkitaraman |
| 2009/0110179 A1 | 4/2009 | Elsey et al. |
| 2009/0119266 A1 | 5/2009 | Fitzpatrick et al. |
| 2009/0125523 A1 | 5/2009 | Fitzpatrick et al. |
| 2009/0144632 A1 | 6/2009 | Mendez |
| 2009/0147008 A1 | 6/2009 | Do et al. |
| 2009/0149203 A1 | 6/2009 | Backholm et al. |
| 2009/0156178 A1 | 6/2009 | Elsey et al. |
| 2009/0157792 A1 | 6/2009 | Fiatal |
| 2009/0164433 A1 | 6/2009 | R et al. |
| 2009/0164560 A1 | 6/2009 | Fiatal |
| 2009/0172565 A1 | 7/2009 | Jackson et al. |
| 2009/0181641 A1 | 7/2009 | Fiatal |
| 2009/0182500 A1 | 7/2009 | Dicke |
| 2009/0187939 A1 | 7/2009 | Lajoie |
| 2009/0191903 A1 | 7/2009 | Fiatal |
| 2009/0193130 A1 | 7/2009 | Fiatal |
| 2009/0193338 A1 | 7/2009 | Fiatal |
| 2009/0221326 A1 | 9/2009 | Roussel et al. |
| 2009/0241180 A1 | 9/2009 | Fiatal |
| 2009/0248670 A1 | 10/2009 | Fiatal |
| 2009/0248696 A1 | 10/2009 | Rowles et al. |
| 2009/0248794 A1 | 10/2009 | Helms et al. |
| 2009/0252136 A1 | 10/2009 | Mahany et al. |
| 2009/0264138 A1 | 10/2009 | Kang et al. |
| 2009/0282125 A1 | 11/2009 | Jeide et al. |
| 2009/0286560 A1 | 11/2009 | Willis |
| 2009/0287750 A1 | 11/2009 | Banavar et al. |
| 2009/0299817 A1 | 12/2009 | Fok et al. |
| 2009/0307133 A1 | 12/2009 | Holloway et al. |
| 2009/0318171 A1 | 12/2009 | Backholm et al. |
| 2009/0323678 A1 | 12/2009 | Wang |
| 2009/0325565 A1 | 12/2009 | Backholm |
| 2010/0042691 A1 | 2/2010 | Maguire |
| 2010/0057924 A1 | 3/2010 | Rauber et al. |
| 2010/0077035 A1 | 3/2010 | Li et al. |
| 2010/0077083 A1 | 3/2010 | Tran et al. |
| 2010/0087167 A1 | 4/2010 | Tsurutome et al. |
| 2010/0088722 A1 | 4/2010 | Jiang |
| 2010/0115050 A1 | 5/2010 | Sultenfuss et al. |
| 2010/0131593 A1 | 5/2010 | Kihara et al. |
| 2010/0131617 A1 | 5/2010 | Osborne et al. |
| 2010/0146107 A1 | 6/2010 | Fiatal |
| 2010/0174735 A1 | 7/2010 | Fiatal |
| 2010/0174939 A1 | 7/2010 | Vexler |
| 2010/0211651 A1 | 8/2010 | Guedalia et al. |
| 2010/0279662 A1 | 11/2010 | Kuusinen et al. |
| 2010/0313018 A1 | 12/2010 | Jorgensen |
| 2010/0319054 A1 | 12/2010 | Mehta et al. |
| 2011/0040718 A1 | 2/2011 | Tendjoukian et al. |
| 2011/0065424 A1 | 3/2011 | Estevez et al. |
| 2011/0113109 A1 | 5/2011 | LeVasseur et al. |
| 2011/0138402 A1 | 6/2011 | Fleming |
| 2011/0165889 A1 | 7/2011 | Fiatal et al. |
| 2011/0179138 A1 | 7/2011 | Van Geest et al. |
| 2011/0179377 A1 | 7/2011 | Fleming |
| 2011/0184827 A1 | 7/2011 | Hubert |
| 2011/0190014 A1 | 8/2011 | Fiatal |
| 2011/0191474 A1 | 8/2011 | Fiatal |
| 2011/0201304 A1 | 8/2011 | Sutaria et al. |
| 2011/0207436 A1 | 8/2011 | van Gent et al. |
| 2011/0208810 A1 | 8/2011 | Li et al. |
| 2011/0213800 A1 | 9/2011 | Saros et al. |
| 2011/0213898 A1 | 9/2011 | Fiatal et al. |
| 2011/0238772 A1 | 9/2011 | Fiatal |
| 2011/0246950 A1 | 10/2011 | Luna et al. |
| 2011/0252088 A1 | 10/2011 | Fiatal |
| 2011/0264622 A1 | 10/2011 | Vargas et al. |
| 2011/0264731 A1 | 10/2011 | Knowles et al. |
| 2011/0294463 A1 | 12/2011 | Fiatal |
| 2011/0294464 A1 | 12/2011 | Fiatal |
| 2011/0302154 A1 | 12/2011 | Snyder |
| 2012/0023190 A1 | 1/2012 | Backholm et al. |
| 2012/0023226 A1 | 1/2012 | Petersen et al. |
| 2012/0023236 A1 | 1/2012 | Backholm et al. |
| 2013/0346312 A1* | 12/2013 | Calabrese et al. ............... 705/44 |
| 2014/0025953 A1 | 1/2014 | Venters et al. |

FOREIGN PATENT DOCUMENTS

| | | |
|---|---|---|
| EP | 1422899 A1 | 5/2004 |
| EP | 1466261 A1 | 10/2004 |
| EP | 1466435 A1 | 10/2004 |
| EP | 1482702 A1 | 12/2004 |
| EP | 1815634 A1 | 8/2007 |
| EP | 1815652 A1 | 8/2007 |
| EP | 1817883 A1 | 8/2007 |
| FI | 117152 B | 6/2006 |
| FI | 118288 B | 9/2007 |
| FI | 119581 B | 12/2008 |
| JP | 4154233 A | 5/1992 |
| JP | 10-336372 A | 12/1998 |
| JP | 2001-218185 A | 8/2001 |
| JP | 2001-350718 A | 12/2001 |
| JP | 2001-356973 A | 12/2001 |
| JP | 2005-515664 T | 5/2005 |
| JP | 2009-207177 A | 9/2009 |
| JP | 4386732 B2 | 10/2009 |
| KR | 2001-0018568 A | 3/2001 |
| KR | 2007-0071858 A1 | 7/2007 |
| KR | 2009-0077515 A | 7/2009 |
| WO | WO 97/41661 A2 | 11/1997 |
| WO | WO 98/24257 A1 | 6/1998 |
| WO | WO 98/58322 A2 | 12/1998 |
| WO | WO 01/30130 A2 | 5/2001 |
| WO | WO 03/007570 A1 | 1/2003 |
| WO | WO 03/058483 A1 | 7/2003 |
| WO | WO 03/058879 A1 | 7/2003 |
| WO | WO 03/065701 A1 | 8/2003 |
| WO | WO 03/098890 A1 | 11/2003 |
| WO | WO 2004/017591 A2 | 2/2004 |
| WO | WO 2004/045171 A1 | 5/2004 |
| WO | WO 2005/015925 A2 | 2/2005 |
| WO | WO 2005/020108 A1 | 3/2005 |
| WO | WO 2006/045005 A1 | 4/2006 |
| WO | WO 2006/045102 A2 | 4/2006 |
| WO | WO 2006/053952 A1 | 5/2006 |
| WO | WO 2006/053954 A1 | 5/2006 |
| WO | WO 2006/058967 A1 | 6/2006 |
| WO | WO 2007/015725 A2 | 2/2007 |
| WO | WO 2007/015726 A1 | 2/2007 |
| WO | WO 2007/149526 A2 | 12/2007 |
| WO | WO 2007/149540 A2 | 12/2007 |
| WO | WO 2011/126889 A2 | 10/2011 |
| WO | WO 2012/018430 A1 | 2/2012 |
| WO | WO 2012/018431 A1 | 2/2012 |
| WO | WO 2012/018477 A2 | 2/2012 |
| WO | WO 2012/018479 A2 | 2/2012 |
| WO | WO 2012/018556 A2 | 2/2012 |
| WO | WO 2012/024030 A2 | 2/2012 |

OTHER PUBLICATIONS

Android Developers, "Date," 10 pages, Oct. 27, 2011.
Augun, Audrey, "Integrating Lotus Notes With Enterprise Data," Lotus Notes Advisory, pp. 22-25, Jul.-Aug. 1996.
Balaban, Bob, "This Is Not Your Father's Basic: LotusScript in Notes Release 4," The View, vol. 1, Issue 5, 32 pages, Nov.-Dec. 1995.
Bedell, Doug, "Meeting Your New Best Friends Six Degrees Widens Your Contacts in Exchange for Sampling Web Sites," The Dallas Morning News, 4 pages, Oct. 27, 1998.

(56) References Cited

OTHER PUBLICATIONS

Bergman, Lawrence D. et al., "Programming-By-Demonstration for Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Published prior to Feb. 23, 2006.
Blaney, Jeff, "You Can Take It With You—An Introduction to Mobile Computing With Notes R4," The View, vol. 2, Issue 1, 14 pages, Jan.-Feb. 1996.
Braden, R., "Requirements for Internet Hosts—Application and Support," RFC 1123, 80 pages, Oct. 1989.
Brown, Kevin et al., "Mastering Lotus Notes®," Sybex Inc., 996 pages, 1995.
"Chapter: About NotesPump," Publication Unknown, 480 pages, Published prior to Jan. 8, 2003.
"Chapter 13-1—Anatomy of a Note ID," Publication Unknown, 8 pages, Published prior to Jan. 8, 2003.
Cole, Barb et al., "Lotus Airs Notes-To-Database Integration Tool," Network World, 2 pages, Oct. 2, 1995.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Dahl, Andrew, "Lotus Notes® 4 Administrator's Survival Guide," Sams Publishing, 64 pages, 1996.
Decker, Stefan et al., "The Social Semantic Desktop," Digital Enterprise Research Institute, DERI Technical Report May 2, 2004, 7 pages, May 2004.
Elz, R. et al., "Clarifications to the DNS Specification," RFC 2181, 12 pages, Jul. 1997.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
European Patent Application No. EP 05815115.0, Supplementary European Search Report, 7 pages, Nov. 17, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.
GSM Association, "Network Efficiency Task Force Fast Dormancy Best Practices," V1.0, 21 pages, May 26, 2010.
Haas, Zygmunt J. et al., "Mobile-TCP: An Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in a Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/US2005/038135, International Preliminary Report on Patentability, 9 pages, Oct. 31, 2011.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
International Application No. PCT/US2011/043322, International Search Report, 9 pages, Feb. 9, 2012.
International Application No. PCT/US2011/043328, International Search Report, 12 pages, Feb. 27, 2012.
International Application No. PCT/US2011/043409, International Search Report, 11 pages, Feb. 9, 2012.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99-1776, 14 pages, Oct. 1999.
Koeppel, Dan, "GUIs Just Want to Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.

(56) References Cited

OTHER PUBLICATIONS

Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server for NetWare, OS-2, and Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmers Guide—Part 1," Release 4, 614 pages, 1995.
Lotus Development Corporation, "Lotus Notes Programmers Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.
Lotus Development Corporation, "Lotus Notes Quick Reference for Windows and Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Published prior to Jan. 8, 2003.
MacGregor, Rob et al., "The Domino Defense: Security in Lotus Notes and the Internet," IBM Corporation, 183 pages, Dec. 1997.
Maltz, David A. et al., "MSOCKS: An Architecture for Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin is in," TechRepublic, 4 pages, Apr. 4, 2001.
McMullen, Melanie, "Network Remote Access and Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—CRYPTO '85 Proceedings, vol. 218, pp. 417-426, 1985.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.

(56) References Cited

OTHER PUBLICATIONS

National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Published prior to Jan. 8, 2003.
Opyt, Barbara et al., "Use the Internet as Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What Is Lotus NotesPump?," Publication Unknown, 88 pages, Published prior to Jan. 8, 2003.
Perez, Sarah, "Onavo's Data-Compressing Mobile App Raises $10 Million Series B From Horizons, Motorola Ventures," 2 pages, Jan. 24, 2012.
Phillips, Joshua et al., "Modeling the Intelligence Analysis Process for Intelligent User Agent Development," Research and Practice in Human Resource Management, vol. 9, No. 1, pp. 59-73, 2001.
Pyle, Hugh, "The Architecture of Lotus Notes," Lotus Notes Advisor, Premiere Issue, pp. 18-27, 1995.
Pyle, Lisa, "A Jump Start to the Top Ten R3-To-R4 Migration Considerations," The View, vol. 1, Issue 5, 22 pages, Nov.-Dec. 1995.
Qualcomm Incorporated, "Managing Background Data Traffic in Mobile Devices," 16 pages, Jan. 2012.
Qualcomm, "System Parameter Recommendations to Optimize PS Data User Experience and UE Battery Life," 80-W1112-1, Revision B, 9 pages, Mar. 2007.
Ringel, Meredith et al., "iStuff: A Scalable Architecture for Lightweight, Wireless Devices for Ubicomp User Interfaces," Proceedings of UbiComp 2002, 2 pages, 2002.
Shafran, Andrew Bryce, "Easy Lotus Notes® for Windows™," Que Corporation, 199 pages, 1994.
Signorini, Eugene, "SEVEN's Service-Based Wireless Solutions Enable Enterprises to Untether E-Mail," Wireless/Mobile Enterprise & Commerce, 16 pages, Oct. 2004.
Swedeen, Bret et al., "Under the Microscope—Domino Replication," LDD Today, 8 pages, Oct. 1, 1998.
Tamura, Randall A., "Lotus® Notes™ 4 Unleashed," Sams Publishing, 928 pages, 1996.
U.S. Appl. No. 60/663,463, File History, 113 pages, Mar. 18, 2005.
Vivacqua, Adriana et al., "Profiling and Matchmaking Strategies in Support of Opportunistic Collaboration," CoopIS/DOA/ODBASE 2003, LNCS 2888, pp. 162-177, 2003.
Wainwright, Andrew, "Secrets to Running Lotus Notes: The Decisions No One Tells You How to Make," IBM Corporation, 193 pages, Oct. 1996.
Wilcox, Adam A., "PC Learning Labs Teaches Lotus Notes 3.0," Ziff-Davis Press, 381 pages, 1993.
Wong, Harry, "Casahl's Replic-Action: Delivering True Notes—DBMS Integration," The View, vol. 2, Issue 1, pp. 33-50, Jan.-Feb. 1996.
Office Action for U.S. Appl. No. 13/208,200 dated Oct. 15, 2014.
Office Action Dated May 7, 2014 for U.S. Appl. No. 13/208,185, filed Aug. 11, 2011.
Office Action Dated Mar. 10, 2014 for U.S. Appl. No. 13/208,200, filed Aug. 11, 2011.
Office Action Dated May 9, 2014 for U.S. Appl. No. 13/427,748, filed Mar. 22, 2012.

* cited by examiner

MOBILE VIRTUAL NETWORK OPERATOR

CROSS-REFERENCE TO RELATED APPLICATIONS

This application is a divisional of U.S. patent application Ser. No. 12/008,710 entitled "Mobile Virtual Network Operator" and filed on Jan. 11, 2008, now U.S. Pat. No. 8,107,921 which is related to co-pending U.S. patent application Ser. No. 12/002,300 entitled "Content Delivery to a Mobile Device from a Content Service" and filed on Dec. 13, 2007. This application is also related to co-pending U.S. patent application Ser. No. 11/729,314 entitled "System and Method for Group Management" and filed on Mar. 27, 2007. This application is also related to co-pending U.S. patent application Ser. No. 13/208,200 entitled "System and Method for Providing a Network Service in a Distributed Fashion to a Mobile Device" and filed concurrently herewith. The disclosures of each co-pending application is incorporated herein by reference.

BACKGROUND

1. Field of the Invention

The present invention generally relates to the field of wireless mobile device network services. More specifically, the present invention relates to providing network services to a mobile device over a mobile network.

2. Description of the Background Art

Mobile devices may be used to communicate using a variety of communication mediums over a mobile network, including voice telephone calls, voice mail, email, and text messaging. In addition, a variety of services may be provided over a mobile network such as content from web sites and other providers. For example, digital content such as ringtones may be provided over a mobile network. Typically, the multiple communication mediums, network services, and digital content are provided by different entities whereby interaction and integration may not easily occur.

Providers of network services often desire to offer a bundled package of media and network services to customers under a single brand. However, unless the provider is also a mobile network service provider, the provider of the network services may have difficulty in providing an integrated mobile network service offering to its customers to meet their needs.

SUMMARY

Systems and methods for a mobile virtual network operator to overcome problems in the prior art related to providing mobile network services are provided. The mobile virtual network operator may provide unique content, services, policies, and pricing for mobile network services while utilizing and operating over a mobile network provided by a mobile network service provider. The mobile virtual network operator may brand and bill its services independently from the mobile network service provider. The mobile virtual network operator may bundle network services, communication services, and digital content delivery in an integrated fashion that enables interoperability and seamless communications across multiple mediums.

A system for providing mobile network services includes a first server in communication with a mobile device over a mobile network. The first server is configured to receive a unique authentication token from the mobile device over the mobile network. The first server is further configured to provide a service to the mobile device via the mobile network. The provided service is associated with the unique authentication token and branded by an entity other than an operator of the mobile network. A second server is in communication with the mobile network. The second server is configured to monitor usage of the mobile network by the mobile device. The usage is related to the service provided to the mobile device by the first server.

A method for providing a mobile network service includes receiving a unique authentication token from a mobile device at a server, providing a service to the mobile device via a mobile network, and monitoring usage of the mobile network by the mobile device. The server is in communication with the mobile device over the mobile network. The service is associated with the unique authentication token and branded by an entity other than an operator of the mobile network. The usage is related to the service provided to the mobile device via the mobile network.

A method of billing for a mobile network service provided to a mobile device by a mobile virtual network operator includes identifying a user of the mobile device. The method also includes identifying a service plan purchased from the mobile virtual network operator. The service plan is purchased by the user of the mobile device. The method also includes identifying a mobile network service provided to the mobile device via a mobile network. The mobile network service is provided on behalf of the mobile virtual network operator. The method also includes determining a price of the service plan purchased by the user of the mobile device and a price of the network service provided to the mobile device via the mobile network. The method further includes submitting information representative of an invoice for the service plan purchased and the network service provided to the mobile device. The user is billed on behalf of the mobile network service provider by the mobile virtual network operator.

A computer program is stored on a computer readable storage medium. The program is executable by a processor for performing a method for providing a mobile network service. The method includes providing a unique authentication token from a mobile device to a server and using a service provided by the server via a mobile network. The server is in communication with the mobile device over the mobile network. The service is associated with the unique authentication token and branded by an entity other than an operator of the mobile network. The method further includes downloading a representation of digital content stored at a computing device in communication with the server over a network. The download is responsive to the unique authentication token provided to the server, and the computing device is controlled by an entity other than an entity that operates the mobile network or the server.

DETAILED DESCRIPTION

Figure 1:
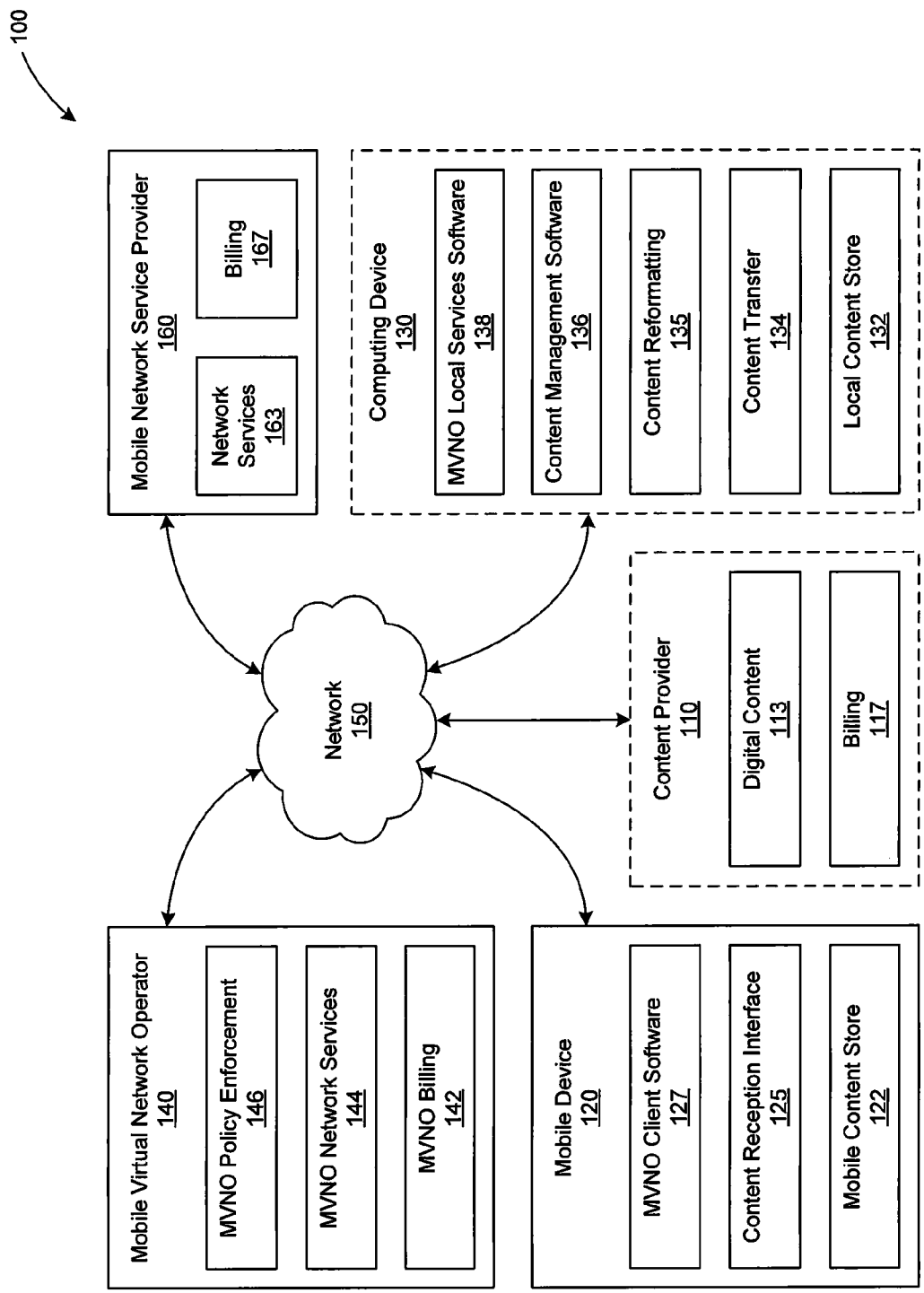
FIG. 1 is an illustration of a mobile virtual network.

FIG. 1 is an illustration of a mobile virtual network 100. The mobile virtual network 100 includes a mobile virtual network operator 140 (which may include a server), a mobile network service provider 160, a mobile device 120, an optional personal computing device 130, and an optional content provider 110. All of the aforementioned may be interconnected through network 150. The content provider 110, the personal computing device 130, the mobile virtual network operator 140; and the mobile network service provider 160 may include or use computing devices inclusive of a computer processor, memory, computer readable data storage media, network interfaces, and input/output devices such as a video display, keyboard, mouse, touchpad, touch screen, and so forth.

The mobile virtual network operator 140 may include one or more service or processing nodes configured to perform one or more functions of the mobile virtual network operator 140. The mobile virtual network operator 140 may also include a proxy for another service or processing node configured to perform one or more functions of the mobile virtual network operator 140. Each of the one or more nodes of the mobile virtual network operator 140 may independently operate and connect to the network 150. The mobile network service provider 160, the optional content provider 110, and the optional personal computing device 130 may be configured in a similar fashion.

The mobile device 120 may be configured to communicate between a user and other mobile devices as well as one or more computing devices over the network 150. The mobile device 120 may include a cellular telephone, a smart phone, a personal digital assistant (PDA), a wireless e-mail device, or a handheld computer. The mobile device 120 may include communications components (not shown) such as a radio frequency (RF) antenna, an optical transceiver (e.g., infrared), modulator/demodulator, and codec circuitry configured to interface with the network 150 and exchange data over the same. The mobile device 120 may include input/output components such as a display, keypad, keyboard, touchpad, touch screen, microphone, speaker, headphone jack, Bluetooth interface, speech recognition application, e-mail application, web browser application, MP3 music player, and so forth.

A server at the mobile virtual network operator 140 may provide a service to one or more customers over the network 150. The one or more customers may be users of the mobile device 120. The mobile virtual network operator 140 may maintain an account record associated with the user of the mobile device 120.

The account record may include an identifying element such as a user's customer account number, user ID or user name, password, mobile device electronic serial number (ESN), mobile device telephone number, landline telephone number, credit card number, and so forth. The account record may also include a mobile virtual network service plan, connection information for the user's personal computing device 130, account balance, payment history, mobile network service provider account information, and so forth. The mobile virtual network operator 140 may be configured to receive a unique authentication token from the mobile device 120 over the network 150, the unique authentication token being used to identify and authenticate the user of the mobile device 120 as a customer. The unique authentication token may include an identifying element included in the user's account record, as disclosed above.

The mobile virtual network operator 140 may include a mobile virtual network operator (MVNO) policy enforcement application 146 configured to enforce a network service policy associated with the user of the mobile device 120. The network service policy may include a maximum number of minutes of voice service per billing period, a maximum number of data bits transferred per billing period, and a maximum number of Short Message Service (SMS) text messages processed per billing period. The network service policy may also include a maximum number of picture or image files transferred per billing period, a maximum number of audio files transferred per billing period, and a maximum number of video files transferred per billing period. The network service policy may further include a maximum number of stored voice mail messages, an amount of utilized server data storage, and so forth. Transferring a file may include downloading the file, uploading the file, transferring a representation of the file, transmitting data representative of the file, and receiving data representative of the file. The functionality of the MVNO policy enforcement application 146 may be distributed or tasked to software running on the personal computing device 130.

The mobile virtual network operator 140 may include an MVNO network services application 144 configured to provide one or more services to the user of the mobile device 120 over the network 150. The one or more network services provided by the MVNO network services application 144 may additionally utilize a network service provided by the mobile network service provider 160. This utilization may occur via the mobile network services application 163. The one or more services may be associated with the unique authentication token and may be branded by the mobile virtual network operator 140 as a separate entity from the mobile network service provider 160. The functionality of the MVNO network services application 144 may be distributed or tasked to software running on a server at the mobile network service provider 160, MVNO client software 127 running on the mobile device 120, the mobile virtual network operator 140, and/or MVNO local services software 138 running on the personal computing device 130.

The mobile network service provider 160 may include a network services application 163 configured to provide mobile network services to the mobile device 120. The mobile network services may include voice communications between the mobile device 120 and another mobile device, landline telephone, computing device, and so forth over the network 150. The voice communications may include two-way communications as well as voice mail. The mobile network services may also include data communications between the mobile device 120 and another mobile device, computing device, or server over the network 150. The data communications may include internet communications, World Wide Web (WWW) communications, file transfers, SMS text message communications, instant messaging (IM) communications, email communications, and so forth.

The mobile network service provider 160 may be configured to monitor, track, and record the mobile device 120's usage of a network service provided by the mobile network services application 163 and/or an MVNO network services application 144. The record of the usage of the network service may be communicated to a billing application 167, an MVNO billing application 142, and an MVNO policy enforcement application 146. The record may be communicated for the purposes of billing the user for the network services used and/or enforcing policies related to using the network services. A two-way communication between the network services application 163 and the MVNO policy enforcement application 146 may be used to limit network services provided to the mobile device 120 to those that are authorized by the MVNO policy enforcement application 146.

The mobile network service provider 160 may also include a billing application 167 configured to facilitate billing the user for mobile network services provided by the network services application 163. Through the billing application 167, the mobile network service provider 160 may also bill the user on behalf of the mobile virtual network operator 140 and/or optional content provider 110.

The MVNO network services 144 may include a service whereby a user's communications with another person via multiple mediums are associated with one another for easy reference and access via the multiple mediums. The multiple mediums may include SMS text messaging, IM, voice telephone calls, voice over Internet Protocol (IP) communications, email, and multimedia mail. Multiple service providers may also be utilized for each of the multiple mediums.

The mobile virtual network operator 140 may provide a service whereby a user of the mobile device who receives a communication via one medium may respond using a different medium. An incoming message may prompt the user to select a response medium such that the user may choose to respond using the same medium or another medium. For example, the user of the mobile device 120 may receive an SMS text message from a colleague, and respond to the colleague via an email message. The user may respond in a manner similar to responding to the SMS message with another SMS message. In another example, the user may be able to call the colleague by choosing to respond via a voice phone call rather than an SMS message at the response prompt.

The MVNO network services 144 may include a service whereby a user of the mobile device 120 sees a record of communications with a contact that includes multiple mediums within a single list of communications history. The single list of communications history may include communications via SMS text message, IM, email, and voice telephone calls. The record of communications may be organized into a conversation incorporating the multiple mediums. For example, the conversation may include messages exchanged via one or more web email services, one or more personal or enterprise email software packages, one or more IM services, multimedia mail, and so forth.

The MVNO network services 144 may include a service like that described in U.S. application Ser. No. 11/729,314 entitled "System and Method for Group Management," whereby an optimal communication medium for the mobile device to communicate with an entity is determined. The entity may have a contact record stored at the mobile device 120. The contact record may include the entity's name, postal address, email address, mobile telephone number, landline telephone number, instant messenger address, and so forth. The mobile virtual network operator 140 may collect contact information for a contact record from sources associated with multiple communication mediums including email software installed on the personal computing device 130, a contacts database on the mobile device 120, a web email service, an instant messaging service, and so forth. The mobile virtual network operator 140 may monitor availability of a contact via one or more communication mediums and inform the user of the mobile device 120 which communication mediums are best to reach the contact at any given time. The best communication medium to reach the contact may also be dependent on the message type the user wishes to send the contact or a time period in which the user wishes to receive a response from the contact.

The MVNO network services 144 may include a broadcast messaging service whereby the mobile device 120 automatically sends a message to multiple contacts within a designated group of contacts, and the mobile virtual network operator 140 forwards the message via a different communication medium to different contacts depending on a determined optimal transmission communication medium for each contact. For example, a user of the mobile device 120 may send a text message to a group of contacts. Some contacts may receive the message via SMS text messaging, others via email, and still others via IM, based upon the determined optimal transmission communication medium for each contact. The optimal transmission communication medium may be determined based upon various factors such as predetermined preferences, presence, activity, and other contact-dependent factors monitored or determined by the mobile virtual network operator 140.

Each recipient contact may respond via an optimal response communication medium. The optimal response communication medium may be the same as or different from the optimal transmission communication medium. Each recipient's optimal response communication medium may be different than another recipient's optimal response communication medium. The broadcast messaging service may include text messaging, peercast, and polling.

The MVNO network services 144 may include a service whereby digital content is delivered to the mobile device 120 from the mobile virtual network operator 140, a digital content provider 110, a computing device 120, or a mobile network service provider 160. The digital content may be delivered over the network 150 based upon a location of the mobile device 120. The mobile virtual network operator 140 may determine the location of the mobile device 120 via a global positioning system (GPS) device at the mobile device 120, triangulation from multiple mobile network service provider base stations receiving a wireless signal from the mobile device 120, or a user input at the mobile device 120. For example, the mobile virtual network operator 140 may send the mobile device 120 a list of restaurants within several blocks of the location of the mobile device 120 based on a location determination.

The MVNO network services 144 may include a service whereby communications routed to the mobile device 120 are sent via an optimal communication medium, a communication medium appropriate for the location of the mobile device 120, or a communication medium determined to be most likely to be successful at contacting the user of the mobile device 120.

The MVNO network services 144 may include a service whereby the mobile device 120 uploads or transfers a representation of digital content to a computing device or server accessible via the network 150. The transfer may be performed in response to a user selection at the mobile device 120 using a proxy at the mobile virtual network Operator 140. This service may be used, for example, to enable the user of the mobile device 120 to publish photographs, videos, audio recordings, messages, and other digital content created or collected at the mobile device 120 to network-accessible computing devices or servers such as web sites or FTP sites, The service may also enable the mobile device 120 to upload digital content to the personal computing device 130 for personal purposes including data backup or transfer.

The mobile virtual network operator 140 may enable transfers to be made automatically. In one example, a transfer may be performed each time a photograph is taken at the mobile device 120. In another example, a transfer of data not previously uploaded may be performed at some predetermined time according to a backup schedule. A preference may be set at the mobile device 120 to control what data is uploaded, when the transfer occurs, where the transfer is posted, and so forth. The MVNO network services 144 may include a service whereby a communication via the mobile device 120 is journalled or backed up onto the personal computing device 130.

The MVNO network services 144 may include a service whereby the mobile virtual network operator 140 anticipates data that the user of the mobile device 120 may desire and proactively provides that data to the mobile device 120. The mobile virtual network operator 140 may anticipate data that the user desires based upon a variety of factors. These factors may include preset preferences set by the user, historical pattern of data access by the mobile device 120, or a location of the mobile device 120. The mobile virtual network operator 140 may push the anticipated data to the mobile device 120 via a web interface, an instant message, an SMS text message, an email, or other means of data delivery as known in the art.

The MVNO network services 144 may include a service whereby the mobile virtual network operator 140 performs a function in response to an SMS message sent from the mobile device 120. The function may be performed in response to a command or code contained within the SMS message. The function may include providing requested data to the mobile device 120 or performing processing of data and providing results of the processing to the mobile device 120.

The MVNO network services 144 may include a service whereby the mobile virtual network operator 140 proactively provides an advertisement and/or incentive to use mobile network services or access digital content. The advertised services or content may be offered by the mobile virtual network operator 140, a digital content provider 110, or the mobile network service provider 160. The advertisement and/or incentive may be provided via an SMS text message, a perishable application (as described elsewhere herein), or a client applet resident at the mobile device 120.

The MVNO network services 144 may include a service whereby digital content is streamed from the mobile virtual network operator 140 to the mobile device 120. The streamed digital content may originate from the mobile virtual network operator 140. Alternatively, the streamed digital content may be transferred to a server at the mobile virtual network operator 140 from another server over the network 150. The other server may be a digital content provider 110 or a personal computing device 130.

The MVNO network services 144 may include a service whereby a continuous virtual data connection between the mobile device 120 and a server or computing device over the network 150 is maintained even when a connection between the mobile virtual network operator 140 and the mobile device 120 is interrupted. The server or computing device may be digital content provider 110 or personal computing device 130. As an example, the mobile virtual network operator 140 may serve as a proxy for a virtual data connection. The virtual data connection may be a web connection between the mobile device 120 and a server over the network 150. If a network connection between the mobile virtual network operator 140 and the mobile device 120 is temporarily broken, the mobile virtual network operator 140 may continue to maintain an active data connection with the server. The network connection may be broken if the mobile device 120 is turned off or enters a location lacking a sufficient mobile network signal to maintain the network connection. The active data connection between the server and the mobile virtual network operator 140 enables the server to continue to recognize the virtual data connection with the mobile device 120 as being active.

The MVNO network services 144 may include a service whereby perishable software applications and/or digital content are transferred and installed on the mobile device 120 for temporary use. The mobile virtual network operator 140 may transfer and install a perishable application on the mobile device 120 to provide a temporary service to the user of the mobile device 120. After the perishable application is no longer required, the application is automatically deleted. By automatically deleting perishable applications that are no longer needed, memory on the mobile device 120 is freed for other purposes.

The MVNO network services 144 may include a visual voice mail service whereby the MVNO network services 144 stores one or more voice messages for unanswered telephone calls routed to the mobile device. The mobile virtual network operator 140 may create a textual list of the voice messages, optionally including the date, time, duration, and Caller ID information relating to each voice message. The mobile virtual network operator 140 may transfer data corresponding to the list to the mobile device 120 to enable the user of the mobile device 120 to select a voice message to retrieve among the list of stored voice messages.

The user may interact with the mobile virtual network operator 140 to make this selection using a web browser, an applet, a perishable application, or a client application installed on the mobile device 120. The mobile virtual network operator 140 may transfer a representation of the selected voice message to the mobile device 120 in the form of an audio data file, a perishable audio data file, or an audio playback within a voice telephone call. The mobile virtual network operator 140 may utilize servers and services provided by the mobile network service provider 160 to provide the visual voice mail service. For example, the mobile network service provider 160 may store the one or more voice messages on behalf of the mobile virtual network operator 140.

The mobile virtual network operator 140 may include an MVNO billing application 142 configured to facilitate billing a user of the mobile device 120 for network services; such as those provided through the MVNO network services application 144. The MVNO billing application 142 may communicate with the mobile network service provider billing application 167. The purpose of the communication may be for the mobile virtual network operator 140 to bill the user of the mobile device 120. The bill may be for network services 163 provided to the mobile device 120. The bill for the network services 163 may be provided by the mobile virtual network operator 140 on behalf of the mobile network service provider 160. Likewise, the MVNO billing application 142 may communicate with a content provider billing application 117. The purpose of the communication may be for the mobile virtual network operator 140 to bill the user of the mobile device 120. The bill may be for purchases of digital content 113. The bill for the purchases may be provided by the mobile virtual network operator 140 on behalf of the content provider 110.

The applications, content, and functionality of optional content provider 110 described herein may be included in mobile virtual network operator 140 and/or mobile network service provider 160. A server at the content provider 110 may be operated to provide digital content 113 to one or more customers over the network 150. The one or more customers may be users of the mobile device 120 or personal computing device 130. Digital content 113 at content provider 110 may be stored on a computer readable data storage medium such as a magnetic hard drive, optical disk, CD-ROM, DVD-ROM, HD-DVD disk, Blu-ray disk, magnetic tape, or flash memory.

The digital content 113 may include digital audio data files, mobile device ring-tones, e-book data files, picture data files, video data files, e-mail data files, voice message data files, SMS data files, document files, and software applications. The content provider 110 provides representations (e.g., copies) of the digital content 113 over the network 150.

The content provider 110 may also include billing application 117. The content provider 110 may be configured to bill a user for representations of the digital content 113 purchased and/or received from the content service provider 110. The content provider 110 may maintain an account record corresponding to a user, who may be a customer of the content provider 110. The account record may be similar to that described elsewhere herein with reference to the mobile virtual network operator 140. The content provider 110 may use the account record to determine whether to offer the user digital content 113, what items of digital content 113 to make available to the user, and what prices to charge the user for those available items of digital content 113.

The network 150 is inclusive of a wireless network such as a cellular telephone network, a WiFi network, a WiMax network, or a Long Term Evolution (LTE) network. The wireless network may be operated by a mobile network service provider such as the mobile network service provider 160. The network 150 may also include a wired network such as the Internet. The wired network may further include wired connections such as Ethernet connections, plain old telephone service (POTS) connections, digital subscriber line (DSL) connections, community access television (CATV) connections, fiber optic connections, and coaxial cable connections. The wired network may include a network operated by the mobile virtual network operator 140, content provider 110, or mobile network service provider 160. The content provider 110, mobile device 120, personal computing device 130, mobile virtual network operator 140, and/or mobile network service provider 160 may communicate with one another over the network 150 via one or more wireless and/or wired networks.

A user may initiate a connection between the mobile device 120 and the content provider 110 via the network 150. The connection may be established using a web browser running on the mobile device 120 and communicating with a web server running on a server at the content provider 110. Alternatively, the connection may be established using an applet or client software application running on the mobile device 120. The applet or client software application may be included with the MVNO client software 127. The applet or client software application, in turn, communicates with a server software application running on a server at the content provider 110. A content selection interface provided on the mobile device 120 may be configured to inform the user of one or more available items of digital content 113 available from the content provider 110.

The content provider 110 and/or the content selection interface may selectively enumerate available items of the digital content 113. These enumerations may be based upon various criteria such as user preferences, desired digital content genre or category, and user account balance with the content provider 110. The content selection interface may list the available items of digital content 113 in the form of a textual list, collection of graphical icons, or other means of presentation. After the user selects an available item from the list, the content selection interface, through mobile device 120, transmits the selection to the content provider 110 via the network 150.

The content provider 110 may be configured to require the user of the mobile device 120 to authorize a purchase of the selection through the billing application 117. Identifying information (as disclosed elsewhere herein) may be transmitted by the user and/or the mobile device 120 to the content provider 110. The identifying information may be used to authorize the purchase. For example, the identifying information may be compared with the account record. The billing application 117 may store a user's credit card number on file and allow the user to authorize a charge on the credit card by transmitting a password from the mobile device 120 to the content provider 110 or via an SMS message.

The billing application 117 may transmit a Premium SMS message or a Reverse Billed SMS message to the mobile device 120 requesting the user to authorize the purchase of the selection. After the user authorizes a charge for the purchase, the content provider 110 bills the user via the mobile virtual network operator 140 or the mobile network service provider 160 on behalf of the content provider 110. In this manner, the mobile virtual network operator 140 or the mobile network service provider 160 may include a charge from the content provider 110 on the user's mobile virtual network operator or mobile network service provider bill. The user may then pay the mobile virtual network operator 140 or the mobile network service provider 160 directly for the charge as part of the user's bill payment. The mobile virtual network operator 140 or the mobile network service provider 160 then pays the content provider 110 for the charge, which may include a transaction fee.

The content provider 110 may be configured to transfer a representation (e.g., transmit a copy) of the selected digital content 113 to the personal computing device 130 associated with the user of the mobile device 120. The representation may include a single selected format of the selected digital content 113 or multiple formats of the selected digital content 113. For example, the representation may include a digital music file in an MP3 format and another representation of the same digital music file in an AAC format. Alternatively, the representation may include multiple representations of a digital music file encoded at different bit rates. For example, one representation may be optimized for quality at a higher bit rate and have a larger file size, while another representation is optimized to conserve bandwidth at a lower bit rate and have a smaller file size. The representation optimized for quality may be intended for transfer to the mobile device 120 in a single "chunk", while the representation optimized to conserve bandwidth may be intended to transfer to the mobile device 120 via streaming media.

The personal computing device 130 may be owned or controlled by an entity other than the mobile virtual network operator 140, mobile network service provider 160, and content provider 110. Alternatively, the personal computing device 130 may be owned or controlled by an entity that owns or controls any of the above. The personal computing device 130 may be owned or controlled by the user of the mobile device 120. The personal computing device 130 includes MVNO local services software 138. The MVNO local services software 138 may be configured to perform functions related to the MVNO network services application 144. The MVNO local services software 138 may also include a content acquisition application configured to receive the representation of the selected digital content 113 from the content provider 110. The content acquisition application is configured to store the representation of the selected digital content 113 to a local content store 132. The personal computing device 130 may be configured to receive a unique authentication token from the mobile device 120. Based on the authentication token, the personal computing device 130 may authorize the mobile device 120 to access data or utilize services provided by the personal computing device 130.

The local content store 132 may be stored on a computer readable data storage medium as discussed elsewhere herein. The representation of the selected digital content 113 may be stored in an original form as received from the content provider 110. The representation of the selected digital content 113 may be stored in the local content store 132 indefinitely, whether or not a representation of the selected digital content 113 is transferred to the mobile device 120. If the mobile device 120 is lost or damaged, the representation of the selected digital content 113 may not be lost.

The personal computing device 130 also includes content management software 136. The content management software 136 may be configured to manage digital content stored in local content store 132, MVNO local services software 138, content reformatting application 135, and content transfer application 134. Various content management functions may be performed by the content management software 136 or by other software modules in conjunction with the content management software 136.

The personal computing device 130 may be configured to reformat downloaded digital content using the content reformatting application 135. The content reformatting application 135 may decode, encode, transcode, or resample digital content. The content reformatting application 135 may initiate reformatting of the downloaded content in response to a command issued by another software module at the personal computing device 130, the content provider 110, or by the mobile device 120. Reformatting may also occur automatically according to user preferences stored at the personal computing device 130. The content reformatting application 135 may include copying a file stored in the local content store 132 while changing a file format from one format to another, or while changing a bit rate or resolution such that the copy has a different bit rate or resolution than the original.

In one example, the content reformatting application 135 reformats an MPEG-2 encoded video file to a 3GP encoded video file by copying the MPEG-2 encoded video file and saving the copied video file in the local content store 132 as a 3GP encoded video file. In a second example, the content reformatting application 135 reformats an AVI encoded video file having a resolution of 720 by 480 pixels to an AVI encoded video file having a resolution of 360 by 240 pixels. In another example, the content reformatting application 135 reformats an MPEG-4 encoded video file having a frame rate of approximately 30 frames per second (fps) to an MPEG-4 encoded video file having a frame rate of approximately 15 fps. By further example, the content reformatting application 135 reformats an MP3 encoded audio file having a bit rate of 192 kilobits per second (kbps) to an MP3 encoded audio file having a bit rate of 128 kbps.

The content reformatting application 135 may also be configured to reformat the downloaded content based upon a command received from the mobile virtual network operator 140 or available bandwidth between the personal computing device 130 and the mobile device 120. The content reformatting application 135 may also reformat the downloaded content based upon a factor dependent on the personal computing device 130 such as available storage space at the personal computing device 130, a factor dependent on the mobile device 120, a user-selectable preference, or a preset preference. The factor dependent on the mobile device 120 may include supported codecs (e.g., MP3 and WMA), bit rates (i.e., bits per second), sampling rates (i.e., samples per second), sample resolutions (i.e., bits per sample), and video frame rates (i.e., frames per second). The factor dependent on the mobile device 120 may also include processing power, memory size, free available memory, screen size, and screen resolution.

The reformatting may be performed such that the reformatted digital content transferred to the mobile device 120 corresponds to an optimal data size range as determined by factors listed above. As an example, the downloaded content may be reformatted to more compact file sizes when free available memory at the mobile device 120 is low. Alternatively, the downloaded content may be reformatted to larger file sizes when free available memory at the mobile device is high. As another example, the downloaded content may be reformatted to a lower resolution screen size when the mobile device 120 is a cellular telephone than when the mobile device 120 is a PDA. The downloaded content may be reformatted to resolution somewhat larger (finer) than the screen size resolution to allow the downloaded content to be zoomed and cropped to a reasonable degree at the mobile device 120.

The content transfer application 134 is configured to transfer a representation of the downloaded content to the mobile device 120. The content transfer application 134 may transfer the representation of the downloaded content in response to a command received from the content provider 110, the mobile virtual network operator 140, the mobile device 120, a user of the personal computing device 130, and/or the content management software 136. Alternatively, the content transfer application 134 may transfer the representation of the downloaded content automatically according to a user preference setting.

The content transfer application 134 may transfer the representation of the downloaded content to the mobile device 120 as a single file sent in one contiguous "chunk" by a protocol such as File Transfer Protocol (FTP). Alternatively, the content transfer application 134 may transfer the representation of the downloaded content to the mobile device 120 using a streaming media protocol such as User Datagram Protocol (UDP), Real-time Streaming Protocol (RTSP), Real-time Transport Protocol (RTP), Real-time Transport Control Protocol (RTCP), Transmission Control Protocol (TCP), or other protocols suitable for streaming digital media over networks. Transferring the representation using the streaming media protocol may be referred to as "streaming" the representation.

The content reformatting application 135 may be configured to reformat a file stored in the local content store 132 based upon a characteristic of the file such as file size, file type, access history, or probability of being requested by the mobile device 120. The format and/or resolution used for reformatting may be chosen based upon a historical pattern of formats or resolutions previously requested by the mobile device 120. Similarly, a historical record of available bandwidth between the personal computing device 130 and the mobile device 120 may be used.

In an example, downloaded content that is identified as having been frequently accessed is reformatted in advance of being requested by the mobile device 120. Likewise, in another example, downloaded content such as an audio book may be reformatted at a lower bit rate than downloaded content such as a music file, which requires a higher bit rate.

Mobile device 120 includes a content reception interface 125 configured to receive the representation of the downloaded content transferred by the personal computing device 130. The content reception interface 125 may be integrated with various components configured to store the representation of the downloaded content. The downloaded content may be stored at a mobile content store 122 for later retrieval and use on the mobile device 120. The mobile content store 122 may include a computer-readable data storage medium as described elsewhere herein. The content reception interface 125 may alternatively be configured to buffer the representation of the downloaded content for more immediate playback on the mobile device 120.

The mobile virtual network operator 140 may be configured to act as an intermediary between the personal computing device 130 and the mobile device 120. The MVNO network services 144 may include a content transfer application configured to relay data between the personal computing device 130 and the mobile device 120. In this configuration, rather than transferring a representation of the downloaded content from the local content store 132 to the mobile device 120, the content transfer application 134 transfers a representation of the downloaded content to the mobile virtual network operator 140 via the network 150. The mobile virtual network operator content transfer application receives the representation of the downloaded content from the personal computing device 130, optionally reformats the representation of the downloaded content using a content reformatting application within the MVNO network services 144, and transfers the optionally reformatted representation of the downloaded content to the mobile device 120.

The personal computing device 130, the mobile network service provider 160, or the mobile virtual network operator 140 may be configured to monitor and measure available communication channel bandwidth in a connection to the mobile device 120 over the network 150. The available bandwidth may be determined by monitoring data throughput between the personal computing device 130, a digital content provider 110, or mobile virtual network operator 140 and the mobile device 120. The bandwidth may be measured continuously during data transmission such that when a bandwidth measurement value is desired, a separate bandwidth measurement does not need to be made.

Alternatively, the available bandwidth may be determined based on a network service plan that includes policies that enforce a limit on available bandwidth to some predetermined value. For example, a basic network service plan may include a lower bit per second bandwidth for streaming media or a lower limit on kilobits of data transfer per billing period than an expanded network service plan. The available bandwidth may also be determined based upon a difference between the service plan policy limit and a measure of the service already utilized during a billing period. The network service plan may be provided and/or enforced by either or both the mobile virtual network operator 140 and the mobile network service provider 160.

The available bandwidth may be used to determine a format, bit rate, or resolution of the representation of digital content transferred to the mobile device 120. The mobile virtual network operator 140 may reformat digital content transferred to the mobile device 120 to correspond to the available bandwidth. In an example, the personal computing device 130 measures throughput of data transmitted to the mobile device 120 to be 100 kbps. The personal computing device 130 then uses the content reformatting application 135 to resample a selected MP3 file in the local content store 132 from 192 kbps to 96 kbps prior to streaming the MP3 file to the mobile device 120.

The personal computing device 130 may be configured to transfer a representation of any data stored on the personal computing device 130. For example, the personal computing device 130 may allow the mobile device 120 to access data available at the personal computing device 130 such as the downloaded content or other data that was not downloaded from the digital content provider 110, including data on a computer readable storage medium coupled to the personal computing device 130. The personal computing device 130 may include an indexing engine to index data available for access by the mobile device 120 via the computing device 130. The mobile device 120 and the computing device 130 may be configured to communicate with each other in a manner similar to that described elsewhere herein with reference to the mobile device 120 selecting and downloading digital content from the digital content provider 110.

The personal computing device 130 may be configured to receive an authentication token from the mobile device 120 to authorize the mobile device 120 prior to providing data and/or services to the mobile device 120. The authentication token may be an identifying element associated with the user of the mobile device 120 or the mobile device 120 itself.

The personal computing device 130 may be configured to serve as a proxy for the mobile device 120. The personal computing device 130 may allow the mobile device 120 to access network services and servers such as the content provider 110 via a proxy application. The proxy application may be included within the MVNO local services software 138. The proxy application may be configured such that a connection between the mobile device 120 and the content provider 110 via the proxy application appears to be a direct connection.

Alternatively, the proxy application may be configured to allow the mobile device 120 to control a direct connection between the personal computing device 130 and the content provider 110. Additionally, the proxy application may allow the mobile device 120 to access any data available via a connection from the personal computing device 130 to one or more computing devices and servers over the network 150. The mobile device 120 and the proxy application may be configured to communicate with each other in a manner similar to that described elsewhere herein with reference to the mobile device 120 selecting and transferring digital content from the digital content provider 110. The mobile virtual network operator 140 may also be configured to serve as a proxy for the mobile device 120 in a manner described above with reference to the personal computing device 130.

Figure 2:
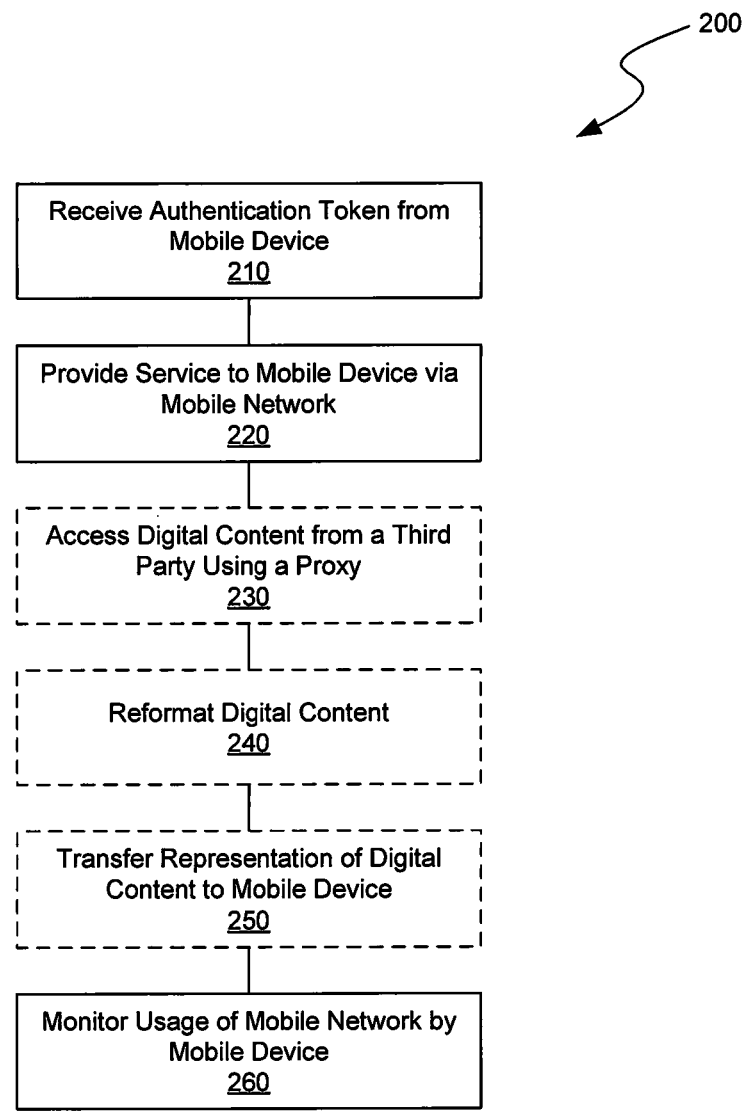
FIG. 2 is a flowchart depicting a method of operating a mobile virtual network.

FIG. 2 is a flowchart depicting a method of operating a mobile virtual network. In this exemplary method 200, a mobile network service is provided by authenticating a mobile device (120) over a mobile network, providing a service to the mobile device, and monitoring usage of the mobile network by the mobile device.

In step 210, the mobile device is authenticated over the mobile network. A server associated with a mobile virtual network operator (MVNO, 140) may receive an identifying element from the mobile device. The identifying element may be used as a unique authentication token to authenticate the mobile device. The server may then authenticate the mobile device based on the authentication token. The mobile device may be communicatively coupled to the server over the mobile network.

In step 220, a service is provided to the mobile device via the mobile network. The service may be provided in response to or in association with the authentication token discussed with reference to step 210. The service may be branded by an entity other than the operator of the mobile network. For example, the service may be branded by an MVNO.

In optional step 230, digital content on a server communicatively coupled with the mobile network is accessed by the mobile device. The server may be owned or operated by a third party. The third party may be an entity other than an owner or user of the mobile device. The third party may also be an entity other than the MVNO. The access may include receiving a list of digital content available for purchase or download and downloading the digital content to a personal computing device. The personal computing device may be communicatively coupled to both the server and the mobile device. The access may include streaming digital content from the server to the mobile device or a personal computing device. The user may access digital content by first selecting the digital content to access from a list presented to the user at the mobile device. The digital content may be accessed via a proxy application. The proxy application may run on the personal computing device or on a server at the MVNO.

In optional step 240, the digital content is reformatted. The computing device may reformat the digital content by copying the accessed digital content and saving the copied digital content on a computer readable storage medium in a different format. Reformatting may include filtering, transcoding, refactoring, and/or resampling. The reformatting may be performed in response to a request received from the mobile device. This request may include a request to download content in a format different from that of the accessed digital content.

The new format requested may be based upon a variety of factors including user settings, content genre, original content format, DRM authorization, and available free storage space on a computer readable storage medium coupled with the computing device. Additional factors include available bandwidth of a data channel between the mobile device and the computing device and available bandwidth of a data channel between the MVNO and the mobile device. Other factors related to the mobile device include screen size, screen resolution, memory size, available free memory, processing power, supported codecs, supported bit rate, supported sampling rate, supported sample resolution, supported video frame rate, and the like.

The computing device may reformat the digital content in one or more different formats automatically upon receiving the digital content from the content provider. By automatically reformatting in advance of a request to download the digital content to the mobile device, latency between a request to download the reformatted digital content to the mobile device and completion of the requested download may be reduced. The MVNO, which is communicatively coupled with the computing device and the mobile device over the network, may receive the digital content from the computing device and reformat the digital content in preparation to forward the reformatted digital content to the mobile device.

In optional step 250, a representation of the digital content is transferred to the mobile device. The computing device may transfer the representation of the digital content over the network. The MVNO may transfer the representation of the digital content to the mobile device.

The mobile device, the MVNO, and/or the computing device may be configured to automatically and/or periodically transfer a representation of digital content from the computing device to the mobile device. The transferred representation may be chosen according to a variety of factors. The transferred representation may be chosen randomly or according to user settings such as a playlist. The transferred representation may also be chosen according to a history of prior transfers. The history of prior transfers may indicate the frequency with which various digital content has been transferred in the past. The history of prior transfers may also indicate an elapsed time since a particular item of digital content has been transferred. The transferred representation may also be chosen according to a characteristic of recently downloaded digital content or an analysis of web sites recently visited by the user of the mobile device. Additionally, the transferred representation may be chosen according to a location of the mobile device.

The digital content received from the server hosting the digital content may require a storage capacity exceeding the available memory or storage space on the mobile device. The mobile device and/or the computing device may be configured to transfer a representation of a portion of the digital content rather than the entire received digital content. The user of the mobile device may be queried to select one or more portions of the digital content to transfer. The user of the mobile device may be queried regarding whether to transfer the one or more portions of the digital content via contiguous "chunks" and/or streaming media. An algorithm may be utilized to automatically select the one or more portions of the digital content to transfer based upon factors as described elsewhere herein.

The mobile device may be configured to selectively replace existing digital content already stored at the mobile device with a representation of the digital content received from the server hosting the digital content by deleting the selected stored digital content to free storage space prior to transferring the representation of the digital content received from the server. One or more of a variety of algorithms may be provided to select the stored digital content to delete. The algorithm may consider one or more of the following factors in making the selection: available storage space, frequency of access or playback, elapsed time since last access or playback, user-specified priority, or user-selection at a deletion prompt. Additional factors the algorithm may consider include logical grouping or genre of digital content such as music style, artist, album, program series, and so forth. Alternatively, the mobile device may be configured to receive the digital content by streaming media if the mobile device has insufficient available memory or storage space to receive the digital content via contiguous "chunks".

The mobile device, the MVNO, and/or the computing device may be configured to establish a lifetime for a representation of digital content to remain on the mobile device prior to automatically being deleted. The lifetime may be useful to provide a means for digital content to be automatically deleted to free memory on the mobile device. The lifetime may be a characteristic of a perishable or disposable representation of digital content. The lifetime may also be set according to a requirement of the content provider, for example to enforce a rental of digital content as opposed to a purchase of digital content.

In step 260, usage of the mobile network by the mobile device is monitored. Usage of service provided to the mobile device by the mobile virtual network and the mobile network service provider may be monitored. The MVNO or the mobile network service provider may monitor the usage and may track and record the usage. The record of the usage may be used for billing purposes.

Figure 3:
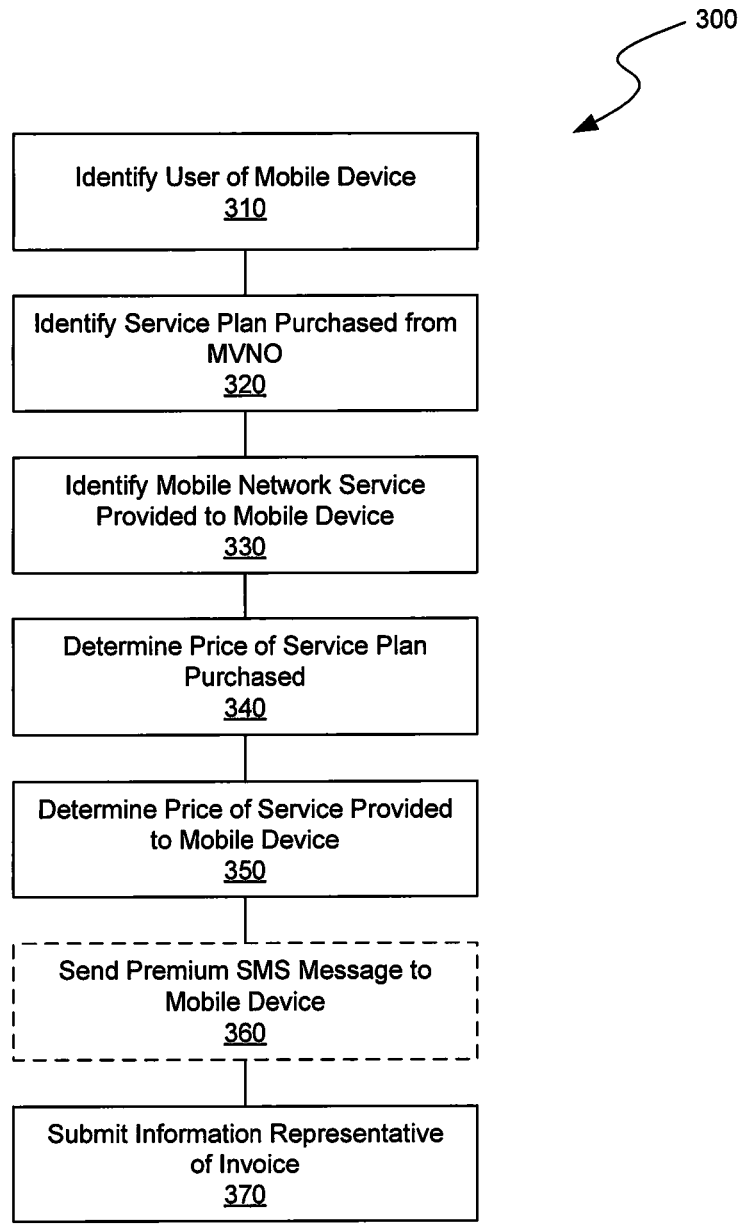
FIG. 3 is a flowchart depicting a billing method for a mobile virtual network operator.

FIG. 3 is a flowchart depicting a billing method 300 for a mobile virtual network operator. In this exemplary billing method 300, a user of a mobile device (120) is identified by the MVNO and/or a mobile network service provider. Additionally, a network service and service plan are identified and priced. Furthermore, the MVNO bills the user on behalf of the mobile network service provider.

In step 310, the user of the mobile device is identified. The MVNO and/or the mobile network service provider may maintain a customer account record corresponding to the user. The user may be a customer of the MVNO. The MVNO and/or the mobile network service provider may identify the user by receiving at least one identifying element from the mobile device and matching the at least one identifying element with the customer account record.

In step 320, the user's service plan subscribed to or purchased from the MVNO is identified. The service plan may be identified by an entry in the user's customer account record. The service plan may also be identified by the user selecting the service plan to purchase from a list or enumeration of service plans offered for purchase to the user.

In step 330, a mobile network service provided to the mobile device is identified. The mobile network service may be provided by the MVNO. Alternatively, the mobile network service may be provided by the mobile network service provider on behalf of the MVNO. Data transmitted by the mobile device may be used to identify the mobile network service. For example, the mobile device may transmit an SMS text message. According to an SMS text message standard protocol, a data sequence may be provided which uniquely identifies the mobile network service as an SMS text message. The mobile network service may also be identified by the user. The user may select the mobile network service from a list or enumeration of mobile network services.

In step 340, a price of the service plan purchased is determined. The price may be determined according to the user's customer account record. The price may also be determined according to list prices offered to all customers. Special offers and discounts offered to the user may also be taken into account in determining the price. An auction may be used to determine the price. Other methods of determining a price as known in the art may be used.

In step 350, a price of the mobile network service provided to the mobile device is determined. The price may be determined in a manner similar to that described with reference to step 340. A financial transaction may be conducted including an agreement by the user to pay the price for the mobile network service provided to the mobile device by the MVNO, the payment optionally being made via a third party.

In an exemplary method of conducting the financial transaction, the MVNO bills the user directly. The MVNO may have the user's credit card on file as part of the user's customer account record. The MVNO may use SMS-based authorization or a software application installed on the mobile device. The software application may be configured to conduct the financial transaction between the user of the mobile device and the MVNO. The software application may include security features such as encryption in conducting the financial transaction. A unique authentication token may be provided by the mobile device to validate the financial transaction.

In optional step 360, a Premium SMS Message is sent to the mobile device. The Premium SMS Message may be sent to the user of the mobile device via the mobile network to conduct a financial transaction. The Premium SMS Message may be encoded to facilitate the following sequence of activities. The user identified in step 310 replies to the Premium SMS Message. By replying, the user confirms an agreement to purchase the service plan and/or the mobile network service selected in steps 320 and 330. Additionally, the user confirms an agreement to pay the prices determined in steps 340 and 350, respectively. Alternatively, the user may be instructed to send an SMS message to a specified number, such as a 5 digit Short Code, to confirm the agreement to purchase the service plan and/or the mobile network service.

The Premium SMS message may be used to validate the financial transaction. Validating the financial transaction includes the following activities. The user identified in step 310 executes an agreement to purchase the service plan and/or the mobile network service selected in steps 320 and 330. The user executes an agreement to purchase the service plan and/or the mobile network service for the prices determined in steps 340 and 350, respectively. The financial transaction may be validated by receiving a purchase confirmation in response to the Premium SMS message. Validating the financial transaction may include the MVNO receiving an identifying element from the user. The identifying element may be used as a unique authentication token to validate the financial transaction.

In step 370, information representative of an invoice for the service plan purchased and the network service provided to the mobile device is submitted to the MVNO. The invoice may relate to the Premium SMS message discussed in relation to step 360. The user may then be billed on behalf of the mobile network service provider by the MVNO. The information may include an identity of the user of the mobile device, a price of the service plan purchased by the user of the mobile device, a price of the network service provided to the mobile device, a date of the purchase, and so forth. A charge for the service plan and network service may be included on an MVNO bill sent to the user. The user may pay the MVNO for the charge. The MVNO may pay the mobile network service provider at least a portion of the amount paid by the user. The MVNO may optionally subtract a transaction fee or the like from the amount paid by the user before paying the mobile network service provider.

Figure 4:
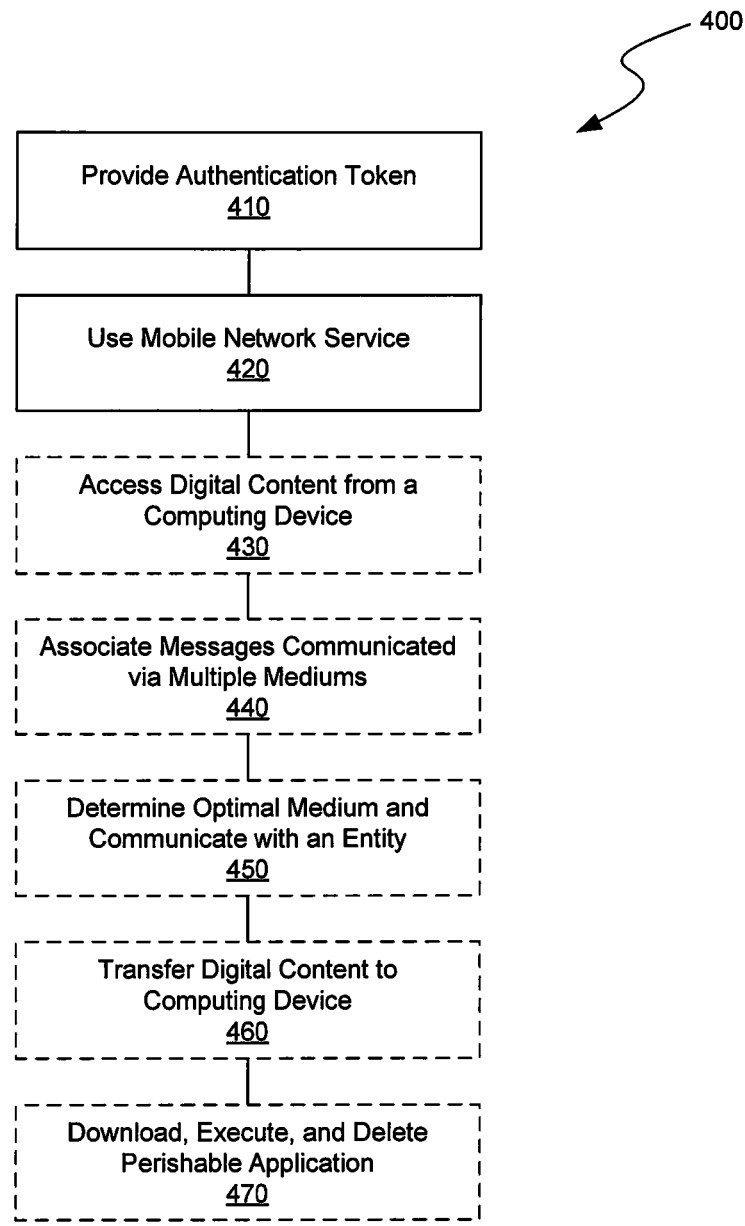
FIG. 4 is a flowchart depicting a method of using a service provided by a mobile virtual network operator.

FIG. 4 is a flowchart depicting a method 400 of using a service provided by a mobile virtual network operator. In this exemplary method 400, a unique authentication token is provided by a mobile device (120) over a mobile network. A network service is used on the mobile device. The method further includes downloading a representation of digital content to the mobile device over the mobile network.

In step 410, a mobile device provides a unique authentication token to a server over a mobile network. The authentication token may be an identifying element used to identify and authenticate the mobile device with a provider of a mobile network service. The server may be associated with the provider of the mobile network service or an MVNO. The server may use the authentication token to authenticate the mobile device.

In step 420, the mobile device uses a service provided by the server via the mobile network. The service may be provided in response to or association with the unique authentication token discussed with reference to step 410. The service may be branded by an entity other than the operator of the mobile network, such as an entity that owns or controls the server or an MVNO.

In optional step 430, the mobile device accesses digital content from a computing device over the mobile network. The access may be performed in a manner similar to optional step 230. The mobile device may download a representation of digital content stored at the computing device communicatively coupled to the server over a network (150). The download may be responsive to or authorized by the unique authentication token provided to the server by the mobile device as described in step 410. The computing device may be owned, operated, or controlled by an entity other than an entity that operates the mobile network or the server. For example, the computing device may be owned, operated, or controlled by a user of the mobile device or a digital content provider.

In optional step 440, messages communicated via multiple mediums are associated with one another. For example, messages communicated with a single entity via multiple mediums may be associated with one another in a chronologically ordered list. The chronologically ordered list may be presented to the user of the mobile device as a single conversation.

In optional step 450, an optimal communication medium is determined for communicating a message to an entity. The message is then communicated to the entity using that medium. The determination of the optimal communication medium may be based on at least one communication characteristic related to the entity, such as most recently used or most frequently used communication medium between the user of the mobile device and the entity. The determination of the optimal communication medium may also be based on time of day or day of week. The determination of the optimal communication medium may also be based on length of message, urgency of message, or type of message (e.g., voice, text, picture, or video). The determination of the optimal communication medium may also be based on user-selectable preference or predefined preference. The determination of the optimal communication medium may also be based on location, presence of the entity, or availability of the entity via the communication medium. After the optimal communication medium is determined, the message is communicated to the entity over the determined optimal communication medium.

In optional step 460, a representation of digital content stored at the mobile device is transferred to the computing device over the network. The transfer may be performed automatically or by explicit instruction from the user of the mobile device. The transfer may be performed to back up the digital content from the mobile device to the computing device. The transfer may be performed to publish the digital content and thereby make the digital content available to others over the network via the computing device.

In optional step 470, a perishable application is downloaded, executed, and deleted. The perishable application is downloaded from a server to the mobile device over the mobile network. The mobile device executes the perishable application. After the perishable application has been executed a predetermined number of times, has resided on the mobile device longer than a preset period of time, or is no longer needed, the perishable application is deleted from the mobile device.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of billing for a mobile network service provided to a mobile device by a virtual network operator comprising:
   identifying a network service provided to the mobile device via a mobile network on behalf of the virtual network operator;
   determining a price of the network service provided to the mobile device via the mobile network;
   submitting information representative of an invoice for the network service provided to the mobile device, wherein the user is billed on behalf of the mobile network service provider by the virtual network operator;
   enforcing, by the virtual network operator, a network service policy associated with the mobile device that specifies an available bandwidth,
   wherein, the virtual network operator reformats digital content transferred to the mobile device based on the available bandwidth and the reformatting includes one of filtering, transcoding, refactoring, and sampling.

2. The method of claim 1, wherein, functionalities of the virtual network operator is distributed between a virtual network operator server and client software on the mobile device.

3. The method of claim 1, wherein, the available bandwidth is determined based upon a difference between a service plan policy limit and a measure of service already utilized during a billing period.

4. The method of claim 1, wherein, functionalities of the virtual network operator is distributed between a virtual network operator server, client software on the mobile device, and a server at the network service provider.

5. The method of claim 1, wherein the network service policy includes, one or more of, a number of minutes of voice service per billing period, a number of data bits transferred per billing period, and a number of Short Message Service (SMS) text messages processed per billing period.

6. The method of claim 1, wherein the network service policy includes, one or more of, a number of picture or image files transferred per billing period, a number of audio files transferred per billing period, and a number of video files transferred per billing period.

7. The method of claim 1, wherein the network service policy includes, one or more of, a number of stored voice mail messages, and an amount of utilized server data storage.

8. The method of claim 1, wherein, the virtual network operator reformats digital content transferred to the mobile device based on a request received from the mobile device.

9. The method of claim 1, wherein, the SMS message in a premium SMS message encoded to enable the user to reply to the SMS message to confirm agreement to pay a bill.

10. The method of claim 1, wherein, the network service policy is further enforced by the mobile network service provider.

11. The method of claim 1, further comprising sending an SMS message to the user of the mobile device via the mobile network to conduct a financial transaction relating to the invoice.

12. The method of claim 1, wherein the user is billed for purchase of digital content.

13. The method of claim 1, wherein the user is billed for purchase of digital content from a content provider; wherein, the content provider bills the user via the virtual network operator.

14. The method of claim 1, wherein virtual network operator brands and bills its services independently from the mobile network service provider.

15. The method of claim 1, further comprising:
   identifying a service plan purchased by a user of the mobile device from the virtual network operator;
   determining a price of the service plan purchased by the user of the mobile device;
   submitting information representative of an invoice for the service plan purchased to the mobile device.

16. A method of billing for a mobile network service provided to a mobile device by a virtual network operator comprising:
   identifying a network service provided to the mobile device via a mobile network on behalf of the virtual network operator;

determining a price of the network service provided to the mobile device via the mobile network;
submitting information representative of an invoice for the network service provided to the mobile device,
wherein the user is billed on behalf of the mobile network service provider by the virtual network operator, and
enforcing, by the virtual network operator, a network service policy associated with the mobile device that specifies an available bandwidth,
wherein, the virtual network operator reformats digital content transferred to the mobile device based on the available bandwidth and on a request received from the mobile device.

* * * * *